US009654266B2

(12) United States Patent
Jang et al.

(10) Patent No.: US 9,654,266 B2
(45) Date of Patent: May 16, 2017

(54) METHOD FOR TRANSRECEIVING DOWNLINK CONTROL INFORMATION IN WIRELESS ACCESS SYSTEM AND APPARATUS FOR SAME

(71) Applicant: LG ELECTRONICS INC., Seoul (KR)

(72) Inventors: Jiwoong Jang, Anyang-si (KR); Hangyu Cho, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 235 days.

(21) Appl. No.: 14/350,345

(22) PCT Filed: Nov. 2, 2012

(86) PCT No.: PCT/KR2012/009167
§ 371 (c)(1),
(2) Date: Apr. 7, 2014

(87) PCT Pub. No.: WO2013/066100
PCT Pub. Date: May 10, 2013

(65) Prior Publication Data
US 2014/0286277 A1    Sep. 25, 2014

Related U.S. Application Data

(60) Provisional application No. 61/554,986, filed on Nov. 3, 2011.

(51) Int. Cl.
*H04L 5/00* (2006.01)
(52) U.S. Cl.
CPC .......... *H04L 5/0053* (2013.01); *H04L 5/0048* (2013.01); *H04L 5/001* (2013.01)

(58) Field of Classification Search
CPC ...... H04L 5/0053; H04L 5/001; H04L 5/0048
See application file for complete search history.

(56) References Cited

U.S. PATENT DOCUMENTS

2010/0331030 A1* 12/2010 Nory ................... H04W 72/042
455/509
2011/0070845 A1* 3/2011 Chen ..................... H04L 5/001
455/91

(Continued)

FOREIGN PATENT DOCUMENTS

KR  10-2010-0106251    10/2010
KR  10-2011-0082485    7/2011

(Continued)

OTHER PUBLICATIONS

PCT International Application No. PCT/KR2012/009167, Written Opinion of the International Searching Authority, dated Mar. 13, 2013, 14 pages.

(Continued)

*Primary Examiner* — Robert M Morlan
*Assistant Examiner* — Nourali Mansoury
(74) *Attorney, Agent, or Firm* — Lee Hong Degerman Kang & Waimey

(57) ABSTRACT

In the present invention, disclosed are a method for transreceiving downlink control information in a wireless access system supporting an enhanced physical downlink control channel (E-PDCCH), and an apparatus for same. More particularly, the method comprises the steps of: transmitting through a physical broadcast channel (PBCH) information with respect to a resource region of a search space that is set inside a physical downlink shared channel (PDSCH) or the enhanced physical downlink control channel (E-PDCCH); and transmitting the downlink control information to a user equipment through the search space.

5 Claims, 22 Drawing Sheets

(56) References Cited

U.S. PATENT DOCUMENTS

| | | | |
|---|---|---|---|
| 2011/0235584 A1* | 9/2011 | Chen | H04L 1/008 370/328 |
| 2012/0106465 A1* | 5/2012 | Haghighat | H04W 72/1289 370/329 |
| 2012/0163305 A1* | 6/2012 | Nimbalker | H04W 52/0206 370/329 |
| 2013/0003663 A1* | 1/2013 | Blankenship | H04L 5/0053 370/329 |
| 2013/0010685 A1* | 1/2013 | Kim | H04L 5/0007 370/315 |
| 2013/0083750 A1* | 4/2013 | Nazar | H04W 72/042 370/329 |
| 2013/0235754 A1* | 9/2013 | Lim | H04W 72/042 370/252 |
| 2013/0265980 A1* | 10/2013 | Zhu | H04L 1/06 370/329 |
| 2014/0185529 A1* | 7/2014 | Lim | H04W 76/023 370/328 |
| 2014/0286275 A1* | 9/2014 | Park | H04L 5/0053 370/329 |
| 2014/0293946 A1* | 10/2014 | Suzuki | H04W 48/12 370/329 |
| 2014/0301330 A1* | 10/2014 | Lee | H04W 74/0833 370/329 |
| 2016/0226645 A1* | 8/2016 | Kim | H04L 1/1861 |

FOREIGN PATENT DOCUMENTS

| | | |
|---|---|---|
| KR | 10-2011-0088432 | 8/2011 |
| KR | 10-2011-0117012 | 10/2011 |

OTHER PUBLICATIONS

PCT International Application No. PCT/KR2012/009167, Notification of Transmittal of the International Search Report and the Written Opinion of the International Searching Authority, or Declaration dated Mar. 13, 2013, 11 pages.

* cited by examiner

FIG. 16
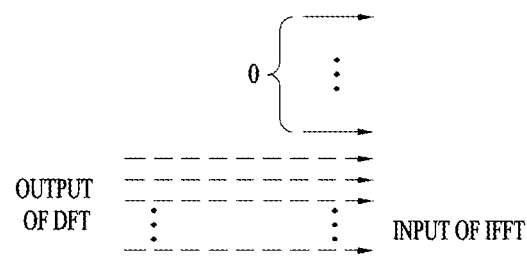
(a)
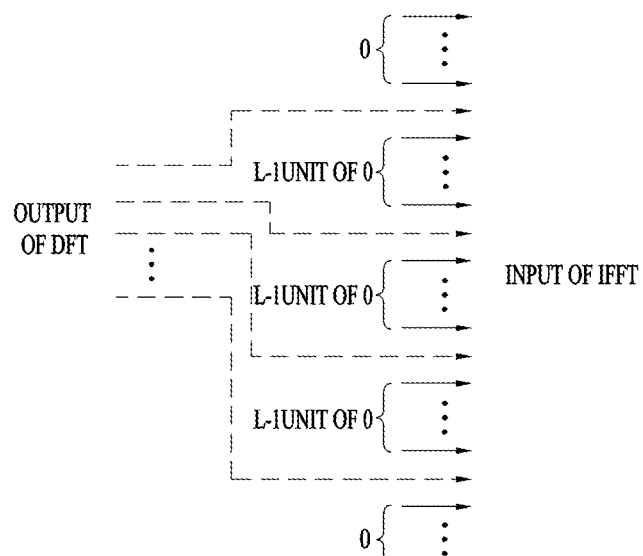
(b)

FIG. 21
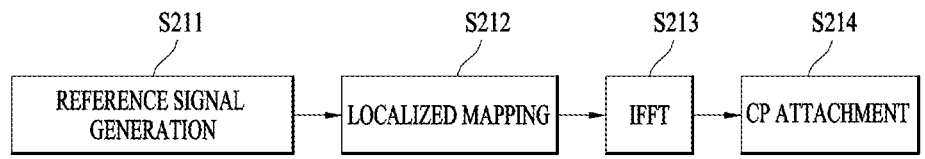
FIG. 22
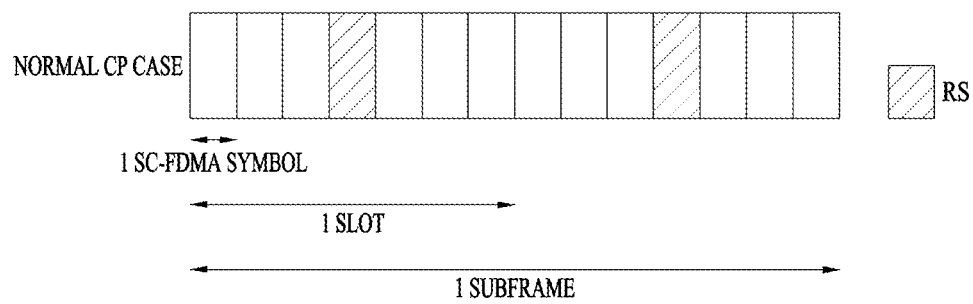
(a)
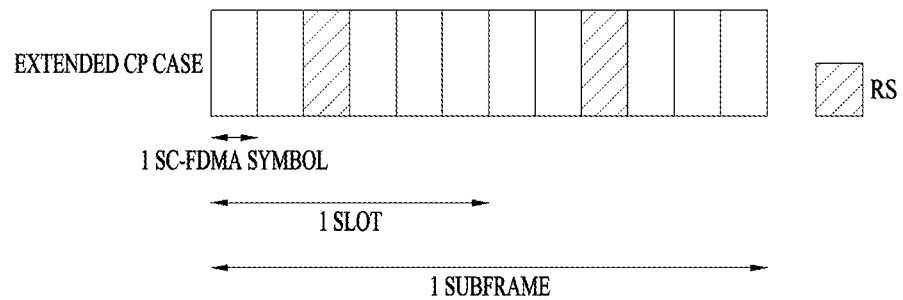
(b)

METHOD FOR TRANSRECEIVING DOWNLINK CONTROL INFORMATION IN WIRELESS ACCESS SYSTEM AND APPARATUS FOR SAME

CROSS-REFERENCE TO RELATED APPLICATIONS

This application is the National Stage filing under 35 U.S.C. 371 of International Application No. PCT/KR2012/009167, filed on Nov. 2, 2012, which claims the benefit of U.S. Provisional Application Ser. No. 61/554,986, filed on Nov. 3, 2011, the contents of which are all hereby incorporated by reference herein in their entirety.

TECHNICAL FIELD

The present invention relates to a radio access system and, more particularly, to a method for transmitting and receiving downlink control information in a radio access system supporting an enhanced physical downlink control channel (E-PDCCH) and an apparatus supporting the same.

BACKGROUND ART

A mobile communication system has been developed in order to provide voice services while ensuring user activity. However, development of mobile communication systems has gradually been extended to data services as well as voice services and has currently been developed to the extent that can provide a high-speed data service. However, in a currently provided mobile communication system, due to resource lack and user requirements for a higher-speed service, more advanced mobile communication systems are required.

As one of the most important requirements of next-generation radio access systems, high data transfer rate requirements should be supported. For supporting high data transfer rate requirements, various technologies such as multiple input multiple output (MIMO), cooperative multiple point transmission (CoMP), carrier aggregation (CA)/multiple cells or relays have been researched.

In order to obtain maximum performance using such technologies, it is difficult to equally use a downlink control channel used in a legacy system. Thus, in a 3GPP LTE-A system, an enhanced physical downlink control channel (E-PDCCH) has been introduced in order to increase capacity of a physical downlink control channel (PDCCH) of a legacy 3GPP LTE system.

DISCLOSURE

Technical Problem

An object of the present invention devised to solve the problem lies in a method for smoothly transmitting and receiving downlink control information between a user equipment (UE) and a base station (BS) in a radio access system supporting an enhanced physical downlink control channel (E-PDCCH), and an apparatus supporting the same.

Another object of the present invention lies in a method for smoothly operating a UE in which an E-PDCCH is configured or a UE, which uses a 3GPP LTE/LTE-A Re-11 scheme and a subsequent scheme thereof, without information about a legacy PDCCH, and an apparatus supporting the same.

Another object of the present invention lies in a method for minimizing increase in delay or UE power, which is necessary to receive downlink control information, and an apparatus supporting the same.

The technical problems solved by the present invention are not limited to the above technical problems and other technical problems which are not described herein will become apparent to those skilled in the art from the following description.

Technical Solution

The object of the present invention can be achieved by providing a method for transmitting downlink control information (DCI) in a radio access system including transmitting, to a user equipment (UE), information about a resource region of a search space set in a physical downlink shared channel (PDSCH) or enhanced physical downlink control channel (E-PDCCH) region via a physical broadcast channel (PBCH) and transmitting the DCI to the UE via the search space.

In another aspect of the present invention, provided herein is a base station (BS) for transmitting downlink control information (DCI) in a radio access system including a radio frequency (RF) unit configured to transmit and receive an RF signal and a processor configured to transmit, to a user equipment (UE), information about a resource region of a search space set in a physical downlink shared channel (PDSCH) or enhanced physical downlink control channel (E-PDCCH) region via a physical broadcast channel (PBCH) and to transmit the DCI to the UE via the search space.

In another aspect of the present invention, provided herein is a method for receiving downlink control information (DCI) in a radio access system including receiving, from a base station (BS), information about a resource region of a search space set in a physical downlink shared channel (PDSCH) or enhanced physical downlink control channel (E-PDCCH) region via a physical broadcast channel (PBCH) and receiving the DCI from the BS via the search space.

In another aspect of the present invention, provided herein is a user equipment (UE) for receiving downlink control information (DCI) in a radio access system including a radio frequency (RF) unit configured to transmit and receive an RF signal and a processor configured to receive, from a base station (BS), information about a resource region of a search space set in a physical downlink shared channel (PDSCH) or enhanced physical downlink control channel (E-PDCCH) region via a physical broadcast channel (PBCH) and to receive the DCI from the BS via the search space.

A plurality of E-PDCCH regions may be set and the information about the resource region of the search space may indicate one or more E-PDCCH regions, in which the search space is set, among the plurality of E-PDCCH regions.

The resource region of the search space may be computed based on a cell ID transmitted via the PBCH.

Antenna port information of a demodulation reference signal used to demodulate the DCI may be transmitted via the PBCH.

Any one of modulation and coding scheme (MCS) information and code rate information for transmitting the DCI may be transmitted via the PBCH.

A response message to a physical random access channel (PRACH) may be transmitted via the search space.

The search space may be a common search space or a UE-specific search space.

Advantageous Effects

According to the embodiments of the present invention, it is possible to smoothly transmit and receive downlink control information between a user equipment (UE) and a base station (BS) in a radio access system and, more preferably, in a radio access system supporting an E-PDCCH.

According to the embodiments of the present invention, it is possible to smoothly operate a UE in which an E-PDCCH is configured or a UE, which uses a 3GPP LTE/LTE-A Re-11 scheme and subsequent scheme thereof, without information about a legacy PDCCH, by defining a search space in a PDSCH or E-PDCCH region.

According to the embodiments of the present invention, it is possible to minimize increase in delay or UE power, which is necessary to receive downlink control information via a search space, by transmitting setting information of the search space defined in a PDSCH or E-PDCCH region via a channel transmitted in a predetermined region regardless of system bandwidth.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention.

FIG. 16 is a diagram illustrating a signal mapping scheme in a frequency domain for satisfying a single carrier property in the frequency domain.

FIG. 21 is a diagram illustrating a signal processing procedure for transmitting a reference signal in uplink.

FIG. 22 is a diagram showing a subframe structure for transmitting a reference signal.

BEST MODE

Figure 1:
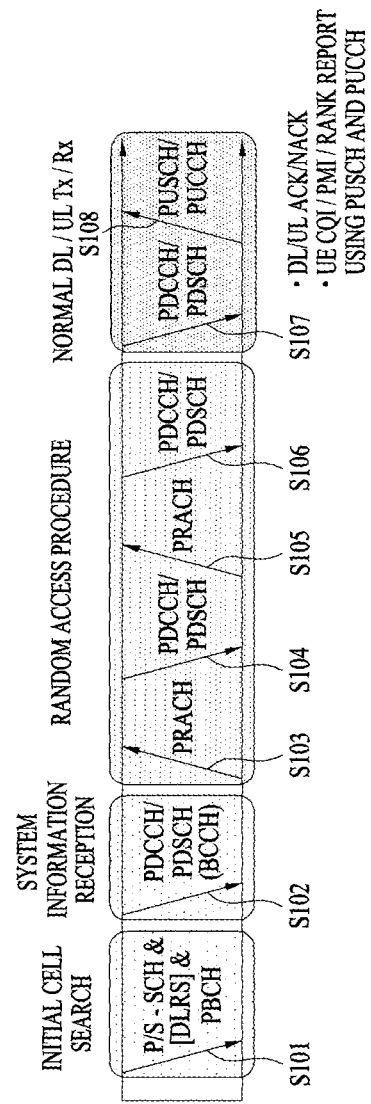
FIG. 1 is a view showing physical channels used for a 3$^{rd}$ Generation Partnership Project (3GPP) Long Term Evolution (LTE) system and a general signal transmission method using the same.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment through which the present invention can be carried out. Hereinafter, the detailed description includes detailed matters to provide full understanding of the present invention. However, it will be apparent to those skilled in the art that the present invention can be carried out without the detailed matters.

In some instances, well-known structures and devices are omitted in order to avoid obscuring the concepts of the present invention and the important functions of the structures and devices are shown in block diagram form.

The embodiments of the present invention are disclosed on the basis of a data communication relationship between a base station and a user equipment. In this case, the base station is used as a terminal node of a network via which the base station can directly communicate with the user equipment. Specific operations to be conducted by the base station in the present invention may also be conducted by an upper node of the base station as necessary. In other words, it will be obvious to those skilled in the art that various operations for enabling the base station to communicate with the user equipment in a network composed of several network nodes including the base station will be conducted by the base station or network nodes other than the base station. The term "Base Station (BS)" may be replaced with the terms fixed station, Node-B, eNode-B (eNB), or access point (AP) as necessary. The term "relay" may be replaced with the term relay node (RN) or relay station (RS). The term "terminal" may also be replaced with the term user equipment (UE), mobile station (MS), mobile subscriber station (MSS), subscriber station (SS), advanced mobile station (AMS), wireless terminal (WT), machine-type communication (MTC) apparatus, machine-to-machine (M2M) apparatus or device-to-device (D2D) apparatus as necessary.

It should be noted that specific terms disclosed in the present invention are proposed for the convenience of description and better understanding of the present invention, and the use of these specific terms may be changed to another format within the technical scope or spirit of the present invention.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) and LTE-Advanced (LTE-A) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following technologies can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied as wireless (or radio) technology such as UTRA (Universal Terrestrial Radio Access) or CDMA2000. TDMA may be embodied with wireless (or radio) technology such as GSM (Global System for Mobile communications)/GPRS (General Packet Radio Service)/EDGE (Enhanced Data Rates for GSM Evolution). OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of the UMTS (Universal Mobile Telecommunications System). 3GPP (3rd Generation Partnership Project) LTE (long term evolution) is a part of the E-UMTS (Evolved UMTS), which uses E-UTRA. 3GPP LTE employs the OFDMA in downlink and employs the SC-FDMA in uplink. LTE-Advanced (LTE-A) is an evolved version of 3GPP LTE.

For clarity, the following description focuses upon 3GPP LTE and LTE-A. However, the technical spirit of the present invention is not limited thereto.

1. General 3GPP LTE/LTE-A System to which the Present Invention may be Applied 1.1. General System FIG. 1 is a view showing physical channels used for a $3^{rd}$ Generation Partnership Project (3GPP) Long Term Evolution (LTE) system and a general signal transmission method using the same.

When a UE is powered on or when the UE newly enters a cell, the UE performs an initial cell search operation such as synchronization with a BS in step S101. For the initial cell search operation, the UE may receive a Primary Synchronization Channel (P-SCH) and a Secondary Synchronization Channel (S-SCH) from the BS so as to perform synchronization with the BS, and acquire information such as a cell ID.

Thereafter, the UE may receive a physical broadcast channel (PBCH) from the BS and acquire broadcast information in the cell. Meanwhile, the UE may receive a Downlink Reference signal (DL RS) in the initial cell search step and confirm a downlink channel state.

The UE, which has completed the initial cell search, may receive a Physical Downlink Control Channel (PDCCH) and a Physical Downlink Shared Channel (PDSCH) corresponding to the PDCCH, and acquire more detailed system information in step S102.

Thereafter, the UE may perform a random access procedure in steps S103 to S106, in order to complete the access to the BS. For the random access procedure, the UE may transmit a preamble via a Physical Random Access Channel (PRACH) (S103), and may receive a message in response to the preamble via the PDCCH and the PDSCH corresponding thereto (S104). In contention-based random access, a contention resolution procedure including the transmission of an additional PRACH (S105) and the reception of the PDCCH and the PDSCH corresponding thereto (S106) may be performed.

The UE, which has performed the above-described procedure, may then receive the PDCCH/PDSCH (S107) and transmit a Physical Uplink Shared Channel (PUSCH)/Physical Uplink Control Channel (PUCCH) (S108), as a general uplink/downlink signal transmission procedure.

Control information transmitted from the UE to the BS is collectively referred to as uplink control information (UCI). The UCI includes hybrid automatic repeat and request acknowledgement/negative-acknowledgement (HARQ ACK/NACK), scheduling request (SR), channel quality information (CQI), precoding matrix indicator (PMI), rank indication (RI), etc.

In general, although UCI is periodically transmitted via a PUCCH in the LTE system, this may be transmitted through a PUSCH if control information and traffic data are simultaneously transmitted. In addition, UCI may be aperiodically transmitted via a PUSCH according to a network request/instruction.

Figure 2:
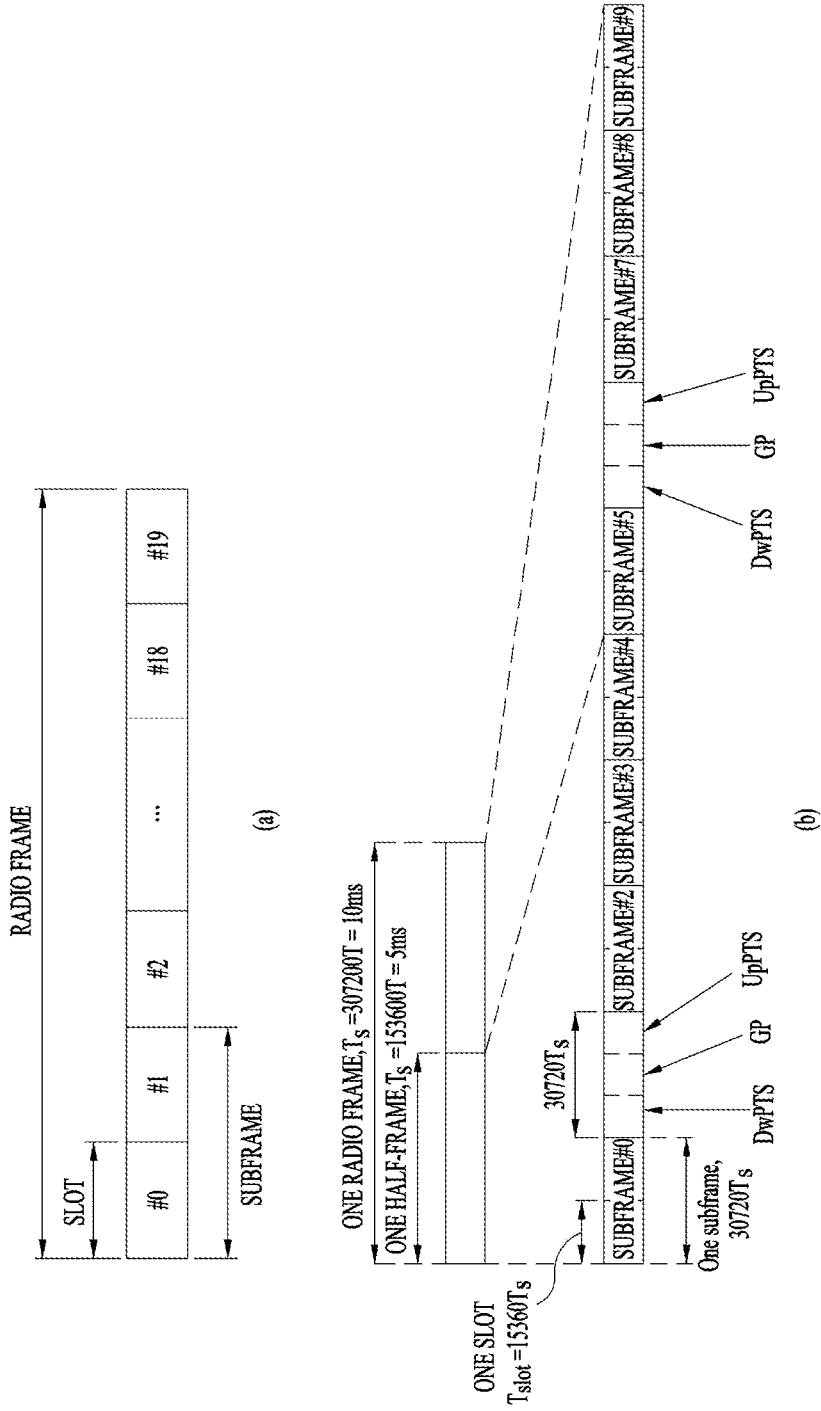
FIG. 2 is a diagram showing the structure of a radio frame used in a 3GPP LTE system.

FIG. 2 is a diagram showing the structure of a radio frame used in a 3GPP LTE system.

In a cellular OFDM radio packet communication system, uplink/downlink data packet transmission is performed in subframe units and one subframe is defined as a predetermined duration including a plurality of OFDM symbols. The 3GPP LTE standard supports a type-1 radio frame structure applicable to frequency division duplex (FDD) and a type-2 radio frame structure applicable to time division duplex (TDD).

FIG. 2(a) shows the structure of the type-1 radio frame. A downlink radio frame includes 10 subframes and one subframe includes two slots in a time domain. A time required to transmit one subframe is referred to as a transmission time interval (TTI). For example, one subframe has a length of 1 ms and one slot has a length of 0.5 ms. One slot includes a plurality of OFDM symbols in a time domain and includes a plurality of resource blocks (RBs) in a frequency domain. In the 3GPP LTE system, since OFDMA is used in the downlink, an OFDM symbol indicates one symbol period. The OFDM symbol may be referred to as an SC-FDMA symbol or symbol period. A RB as a resource allocation unit may include a plurality of consecutive subcarriers in one slot.

The number of OFDM symbols included in one slot may be changed according to the configuration of cyclic prefix (CP). CP includes an extended CP and a normal CP. For example, if OFDM symbols are configured by the normal CP, the number of OFDM symbols included in one slot may be 7. If OFDM symbols are configured by the extended CP, since the length of one OFDM symbol is increased, the number of OFDM symbols included in one slot is less than the number of OFDM symbols in case of the normal CP. In case of the extended CP, for example, the number of OFDM symbols included in one slot may be 6. In the case where a channel state is unstable, such as the case where a UE moves at a high speed, the extended CP may be used in order to further reduce inter-symbol interference.

In case of using the normal CP, since one slot includes seven OFDM symbols, one subframe includes 14 OFDM symbols. At this time, a maximum of three first OFDM symbols of each subframe may be allocated to a physical downlink control channel (PDCCH) and the remaining OFDM symbols may be allocated to a physical downlink shared channel (PDSCH).

FIG. 2(b) shows the structure of the type-2 radio frame. The type-2 radio frame includes two half frames and each half frame includes five subframes. One subframe includes two slots. Among the five subframes, a special subframe includes a downlink pilot time slot (DwPTS), a guard period (GP) and an uplink pilot time slot (UpPTS). The DwPTS is used for initial cell search, synchronization or channel estimation of a UE. The UpPTS is used for channel estimation of a BS and uplink transmission synchronization of a UE. The GP is used to eliminate interference generated in the uplink due to multi-path delay of a downlink signal between the uplink and the downlink.

The structure of the radio frame is only exemplary and the number of subframes included in the radio frame, the number of slots included in the subframe, or the number of symbols included in the slot may be variously changed.

Figure 3:
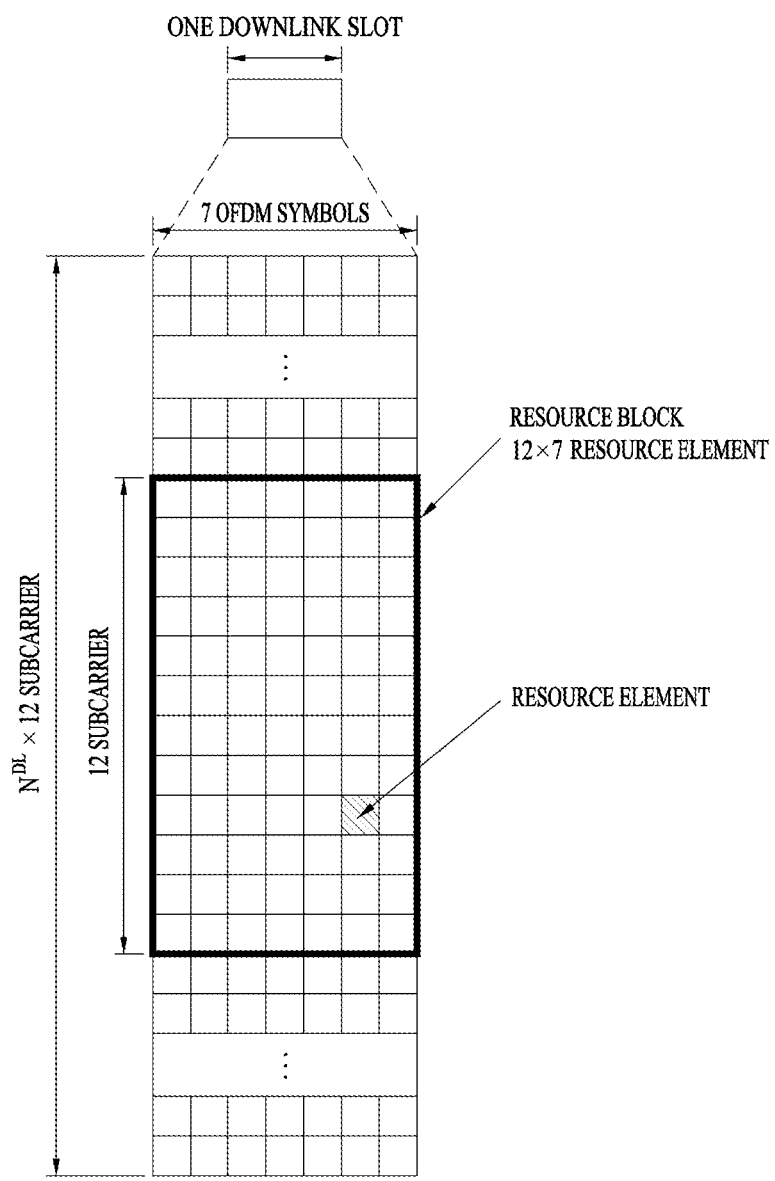
FIG. 3 is a diagram showing a resource grid of one downlink slot.

FIG. 3 is a diagram showing a resource grid of a downlink slot.

Referring to FIG. 3, a downlink slot includes a plurality of OFDM symbols in a time domain. Although one downlink slot may include seven OFDM symbols and one RB may include 12 subcarriers in a frequency domain, the present invention is not limited thereto.

Each element on the resource grid is referred to as a resource element (RE). One RB includes 12×7 REs. The number NDL of RBs included in a downlink slot depends on a downlink transmission bandwidth. The structure of the uplink slot may be equal to the structure of the downlink slot.

Figure 4:
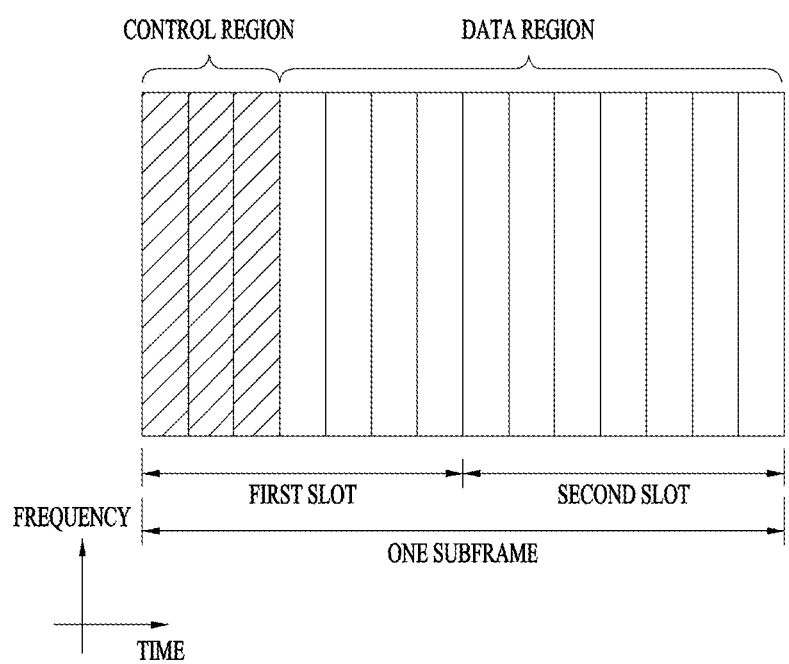
FIG. 4 is a diagram showing the structure of a downlink subframe.

FIG. 4 is a diagram showing the structure of a downlink subframe.

Referring to FIG. 4, a maximum of three OFDM symbols of a front portion of a first slot within one subframe corresponds to a control region to which a control channel is allocated. The remaining OFDM symbols correspond to a data region to which a Physical Downlink Shared Channel (PDSCH) is allocated. Examples of the downlink control channels used in 3GPP LTE include, for example, a Physical Control Format Indicator Channel (PCFICH), a Physical Downlink Control Channel (PDCCH), a Physical Hybrid automatic repeat request Indicator Channel (PHICH), etc.

The PCFICH is transmitted on a first OFDM symbol of a subframe, and carries information about the number of OFDM symbols (that is, the size of the control region) used to transmit the control channel within the subframe. The PHICH carries a HARQ ACK/NACK signal in response to uplink transmission. The control information transmitted through the PDCCH is referred to as Downlink Control Information (DCI). The DCI includes uplink resource allocation information, downlink resource allocation information or an uplink transmit (Tx) power control command for an arbitrary UE group.

Figure 5:
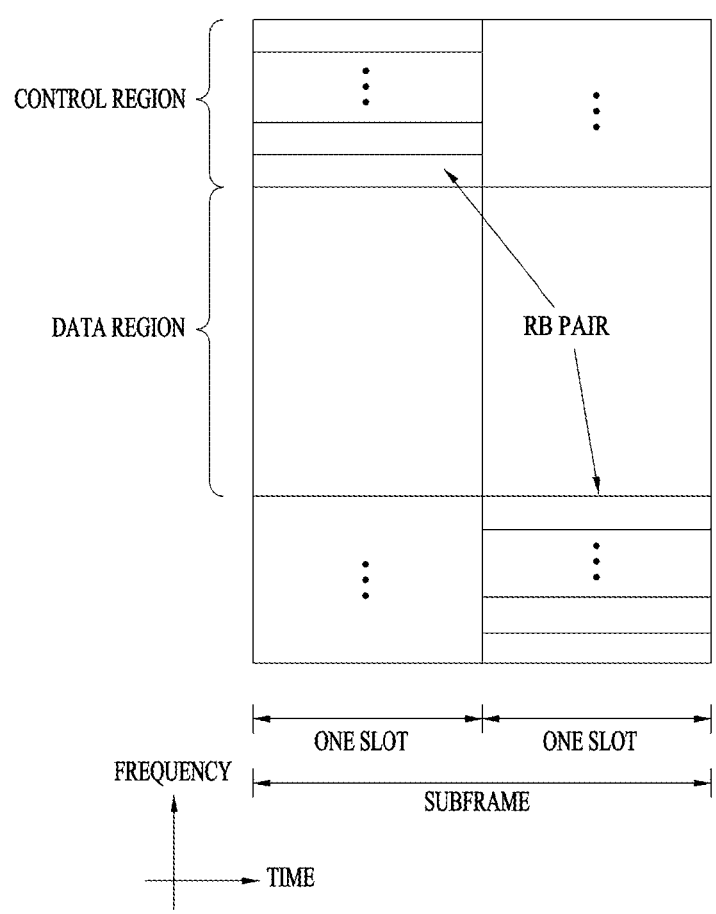
FIG. 5 is a diagram showing the structure of an uplink subframe.

FIG. 5 is a diagram showing the structure of an uplink subframe.

Referring to FIG. 5, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain a single carrier property, one UE does not simultaneously transmit a PUCCH and a PUSCH. The PUCCH for one UE is allocated a resource block (RB) pair in a subframe. RBs belonging to the RB pair occupy different subcarriers in two slots. This is referred to as frequency hopping of an RB pair allocated to the PUCCH in a slot boundary.

Figure 6:
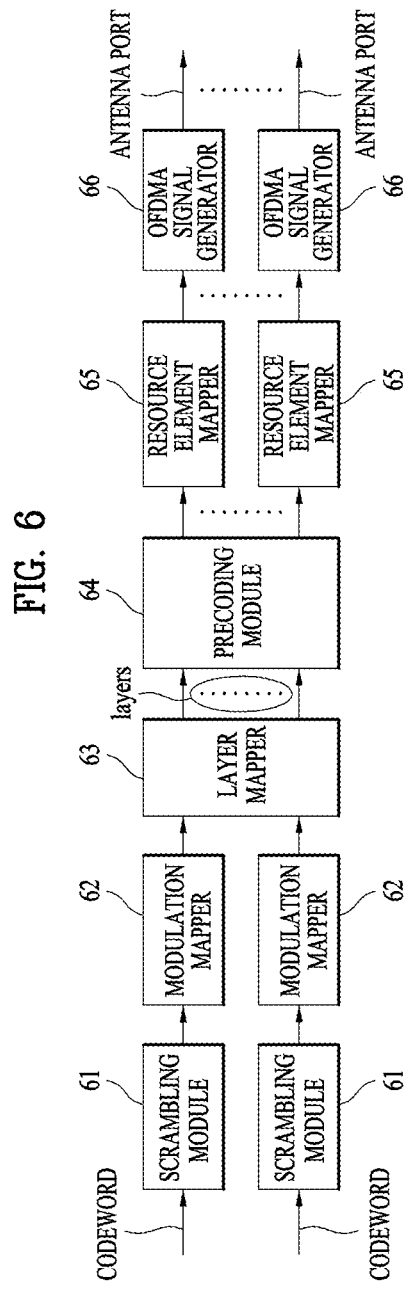
FIG. 6 is a diagram illustrating a signal processing procedure for transmitting a downlink signal at a base station.

FIG. 6 is a diagram illustrating a signal processing procedure for transmitting a downlink signal at a base station (BS).

In a 3GPP LTE system, a BS may transmit one or more codewords (CWs) in the downlink. Accordingly, one or more codewords may be processed to configure complex symbols through scrambling modules 61 and modulation mappers 62. Thereafter, the complex symbols are mapped to a plurality of layers by a layer mapper 63, and each layer may be multiplied by a precoding matrix by a precoding module 64 and may be allocated to each transmission antenna. The processed signals which will respectively be transmitted via antennas may be mapped to time-frequency resource elements by resource element mappers 65, and may respectively be transmitted via OFDM signal generators 66 and antennas.

Figure 7:
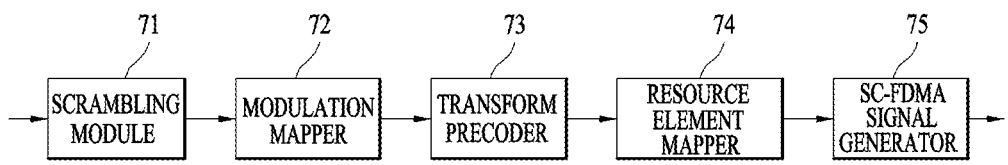
FIG. 7 is a diagram illustrating a signal processing procedure for transmitting an uplink signal at a UE.

FIG. 7 is a diagram illustrating a signal processing procedure for transmitting an uplink signal at a UE.

In order to transmit a UL signal, a scrambling module 71 of the UE may scramble a transmitted signal using a UE-specific scrambling signal. The scrambled signal is input to a modulation mapper 72 so as to be modulated into complex symbols by a Binary Phase Shift Keying (BPSK), Quadrature Phase Shift Keying (QPSK), 16-Quadrature amplitude modulation (QAM) or 64-QAM scheme according to the kind of the transmitted signal and/or the channel state. Thereafter, the modulated complex symbols are processed by a transform precoder 73 and are input to a resource element mapper 74. The resource element mapper 74 may map the complex symbols to time-frequency resource elements. The processed signal may be transmitted to the BS via an SC-FDMA signal generator 75 and an antenna.

Since an OFDMA scheme uses multiple subcarriers, a Peak-to-Average Ratio (PAPR) is relatively large due to overlapping of subcarriers. Accordingly, as described above with reference to FIGS. 6 and 7, in order to solve the problem that the PAPR is large in a UE in which power efficiency is important, an OFDMA scheme is used to transmit a downlink signal, while an single carrier-frequency division multiple access (SC-FDMA) scheme is used to transmit an uplink signal in the 3GPP system (e.g., the LTE system). The SC-FDMA scheme is also referred to as discrete Fourier transform-spread (DFTs) OFDM.

1.2. Downlink System

In a wireless communication system, since data/signals are transmitted through a radio channel, the data/signals may be distorted during transmission. In order to enable a receiver to correctly receive the distorted signal, the distorted signal should be corrected using channel information. At this time, a transmitter and/or a receiver may use a reference signal, which is known to the transmitter and the receiver, in order to detect the channel information. The reference signal is referred to as a pilot signal.

When the transmitter transmits and receives data using multiple antennas, the channel states between the transmission antennas and the reception antennas is preferably detected in order to enable the receiver to correctly receive the signal. At this time, each transmit antenna has an individual reference signal in order to enable the receiver to detect the channel state.

A downlink reference signal includes a Common reference signal (CRS) shared among all UEs in a cell and a Dedicated reference signal (DRS) for only a specific UE. The transmitter may provide information for demodulation and channel measurement to the receiver using the reference signals (CRS and DRS).

The receiver (e.g., UE) measures the channel state using the CRS and feeds an indicator associated with channel quality, such as a Channel Quality Indicator (CQI), a Precoding Matrix Index (PMI) and/or a Rank Indicator (RI), back to the transmitter (BS) according to the measured channel state. In the embodiments of the present invention, the CRS may be also called a cell-specific RS. Alternatively, a reference signal associated with the feedback of Channel State Information (CSI) may be defined as a CSI-RS.

The DRS may be transmitted to the UEs through resource elements (REs) if data demodulation on a PDSCH is necessary. The UE may receive the presence/absence of the DRS through higher layer signaling. The DRS is valid only when the PDSCH is mapped. In the embodiments of the present invention, the DRS may be also called a UE-specific RS or a Demodulation RS (DMRS).

Figure 8:
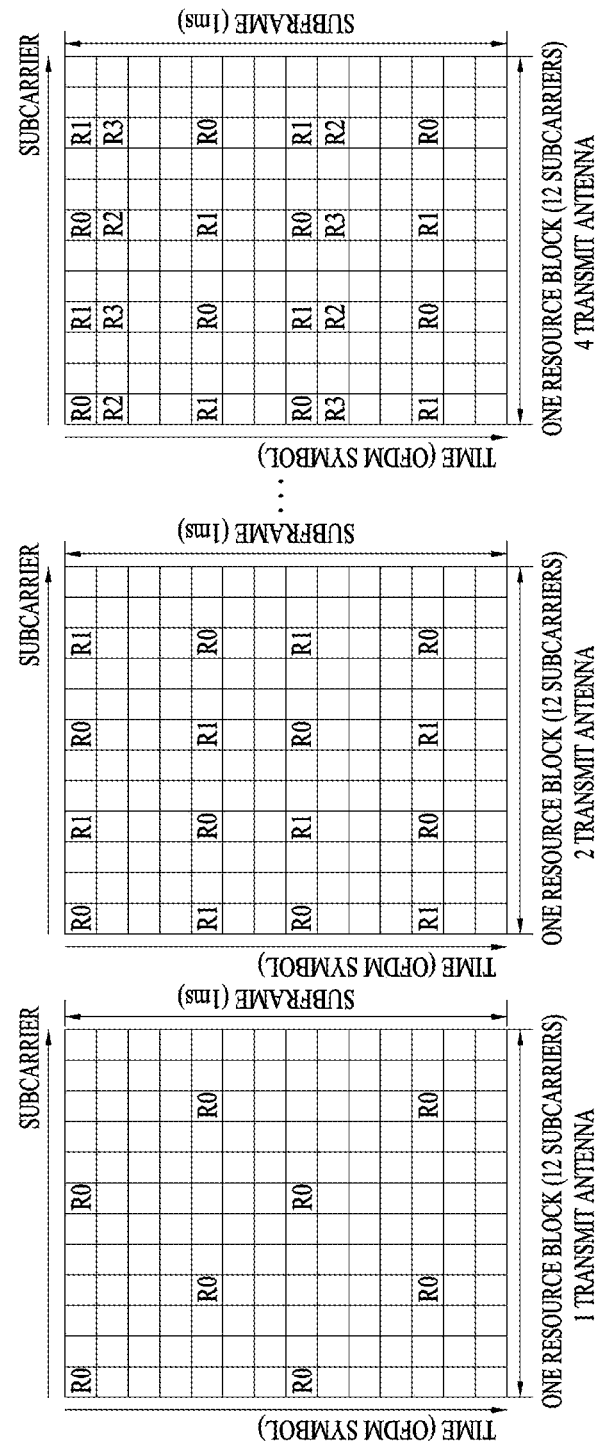
FIG. 8 is a diagram showing a downlink reference signal structure for a system having 1, 2 or 4 transmit (Tx) antennas in a normal cyclic prefix (CP) case.

FIG. 8 is a diagram showing a downlink reference signal structure for a system having 1, 2 or 4 transmit (Tx) antennas in a normal cyclic prefix (CP) case.

Referring to FIG. 8, R0 denotes a reference signal for transmit antenna 0, R1 denotes a reference signal for transmit antenna 1, R2 denotes a reference signal for transmit antenna 2, and R3 denotes a reference signal for transmit antenna 3. Signals for all transmit antennas other than the transmit antennas for transmitting the reference signals are not transmitted on the subcarriers in which the reference signals of the transmit antennas are used, in order to eliminate interference.

Figure 9:
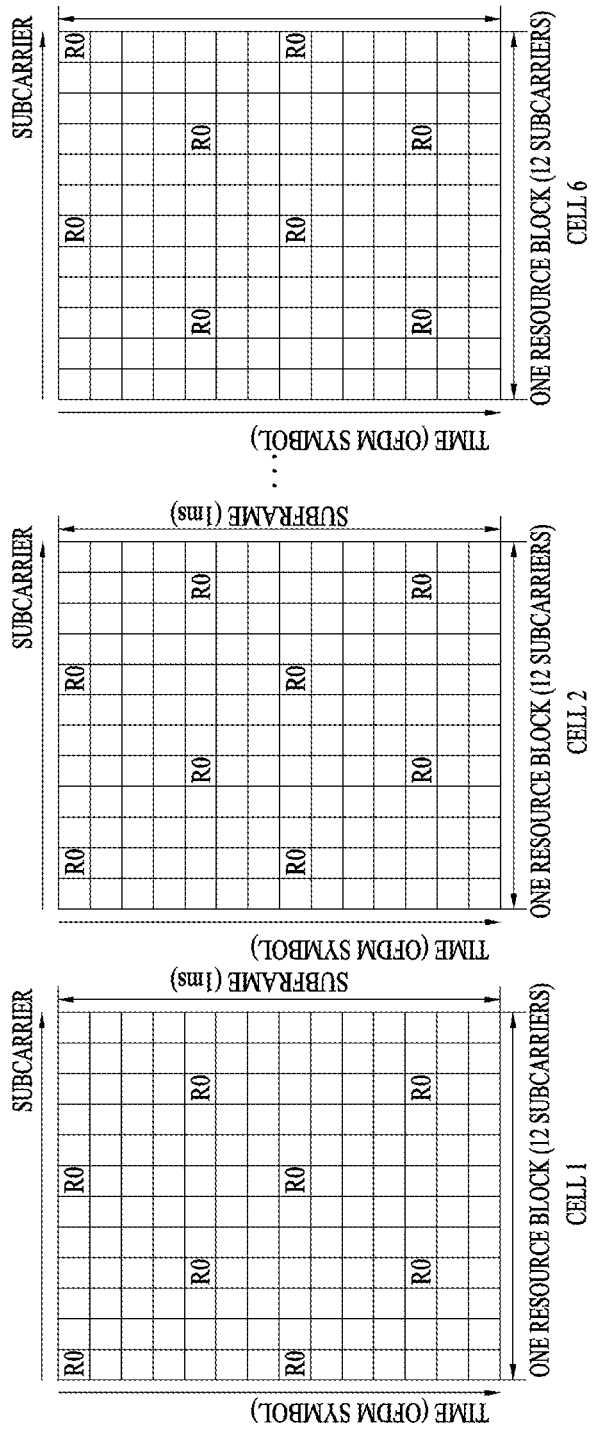
FIG. 9 is a diagram showing a downlink reference signal structure according to frequency shift of a reference signal according to cell in a normal CP case.

FIG. 9 is a diagram showing a downlink reference signal structure according to shift of a reference signal according to cell in a normal CP case.

Referring to FIG. 9, if it is assumed that a structure of a reference signal (or a pilot symbol) for a system having one transmit antenna shown in FIG. 8 is used for a cell 1 of FIG. 9, the reference signal may be protected via shift of subcarrier unit or OFDM symbol unit in a frequency domain or a time domain in cells 2 and 3, in order to prevent collision of the reference signal between cells. For example, as shown in FIG. 9, in a system having one transmit antenna, reference signals may be located at an interval of 6 subcarriers in a frequency domain. Accordingly, in at least 5 adjacent cells, the reference signals may be located at different locations in the frequency domain via shift of subcarrier unit.

Additionally, a per-cell downlink reference signal is multiplied by a pseudo-random (PN) sequence and then is transmitted, such that interference of reference signals received from adjacent cells is reduced in a receiver, thereby improving channel estimation performance. Such a PN sequence is applied in OFDM symbol units within one subframe and is changed according to cell ID, subframe number (or index) and OFDM symbol location.

Figure 10:
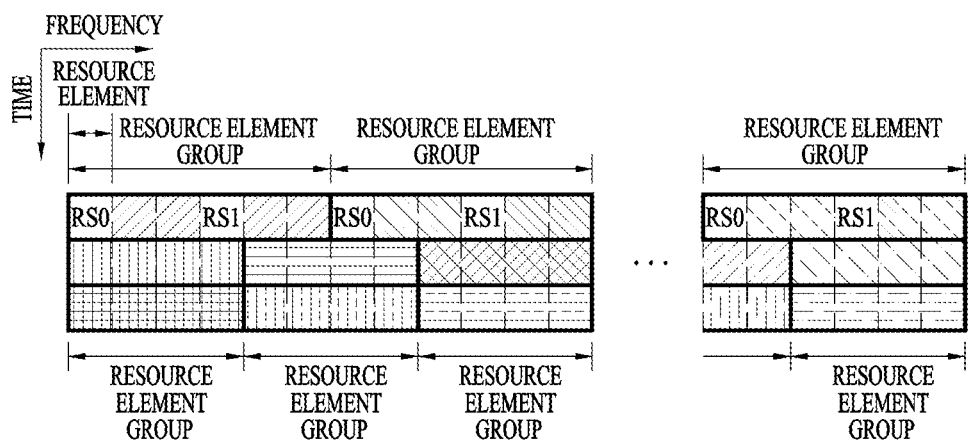
FIG. 10 is a diagram showing a resource configuration of a downlink control channel in a system in which the number of Tx antennas is 1 or 2.
Figure 11:
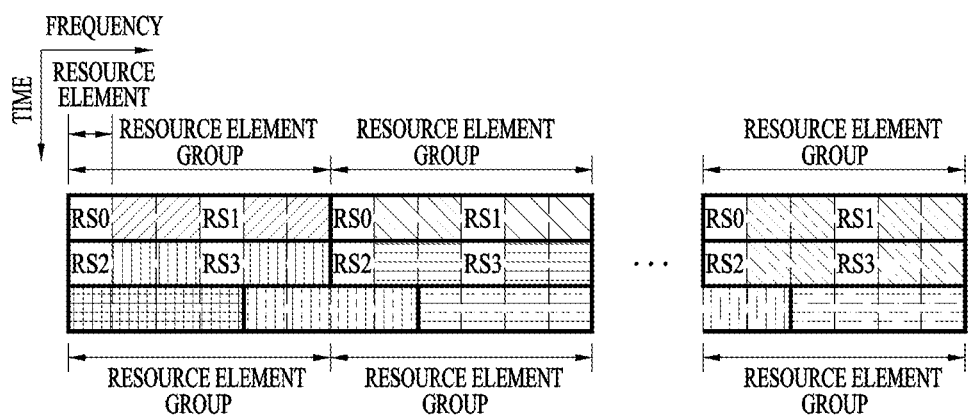
FIG. 11 is a diagram showing a resource configuration of a downlink control channel in a system in which the number of Tx antennas is 4.

In order to allocate the above-described downlink control channel to each subframe, resources may be configured as shown in FIGS. 10 and 11.

FIG. 10 is a diagram showing a resource configuration of a downlink control channel in a system in which the number of Tx antennas is 1 or 2, and FIG. 11 is a diagram showing a resource configuration of a downlink control channel in a system in which the number of Tx antennas is 4. In FIGS. 10 and 11, R0 denotes a reference signal (or a pilot symbol) for transmit antenna 0, R1 denotes a reference signal for transmit antenna 1, R2 denotes a reference signal for transmit antenna 2 and R3 denotes a reference signal for transmit antenna 3.

Referring to FIGS. 10 and 11, the configuration of basic resources of the downlink control channel includes a resource element group (REG). The REG is used to define mapping of control channels to resource elements, the REG may be composed of contiguous resource elements in four frequency domains excluding resource elements used to transmit the reference signal. According to circumstance, a predetermined number of REGs may be used as a downlink control channel. The resource element is used as one subcarrier.

Hereinafter, a PCFICH will be described in detail.

The PCFICH is transmitted via a first OFDM symbol ($0^{th}$ OFDM symbol) in every subframe. The PCFICH may be transmitted via one antenna or using a transmit diversity scheme. The UE confirms control information transmitted via a PCFICH and then receives control information transmitted via a PDCCH, upon receiving a subframe.

The BS may transmit a PDCCH between $0^{th}$ to $2^{nd}$ OFDM symbols in every subframe for resource allocation information of each subframe and may transmit downlink control channel information on $0^{th}$, $0^{th}$ and $1^{st}$ or $0^{th}$ to $2^{nd}$ OFDM symbols according to the amount of downlink control channels. The number of OFDM symbols used for the downlink control channel may be changed according to subframe and is indicated by the PCFICH. Accordingly, the PCFICH is transmitted in every subframe.

Control information transmitted via the PCFICH is also referred to as a control format indicator (CFI). For example, a CFI value may be 1, 2 or 3 and may indicate the number of OFDM symbols used for PDCCH transmission in a subframe. However, this is only exemplary and information indicated by the CFI may be differently defined according to system bandwidth. For example, if the system bandwidth is less than a specific threshold value, the CFI values 1, 2 and 3 may indicate that the numbers of OFDM symbols used for PDCCH transmission in each subframe are respectively 2, 3 and 4.

Table 1 shows an example of a CFI of a PCFICH and a 32-bit CFI codeword generated by performing channel coding with respect to the CFI.

TABLE 1

| CFI | CFI codeword $<b_0, b_1, \ldots, b_{31}>$ |
| --- | --- |
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

Referring to Table 1, CFI=1 indicates that the PDCCH is transmitted only on the $0^{th}$ OFDM symbol and CFI=2 and CFI=3 respectively indicate that the PDCCH is transmitted on $0^{th}$ to $1^{st}$ OFDM symbols and $0^{th}$ to $2^{nd}$ OFDM symbols.

The CFI codeword may be modulated using a quadrature phase shift keying (QPSK) scheme. In this case, a 32-bit codeword is modulated into 16 symbols. Accordingly, 16 subcarriers are used for PCFICH.

Figure 12:
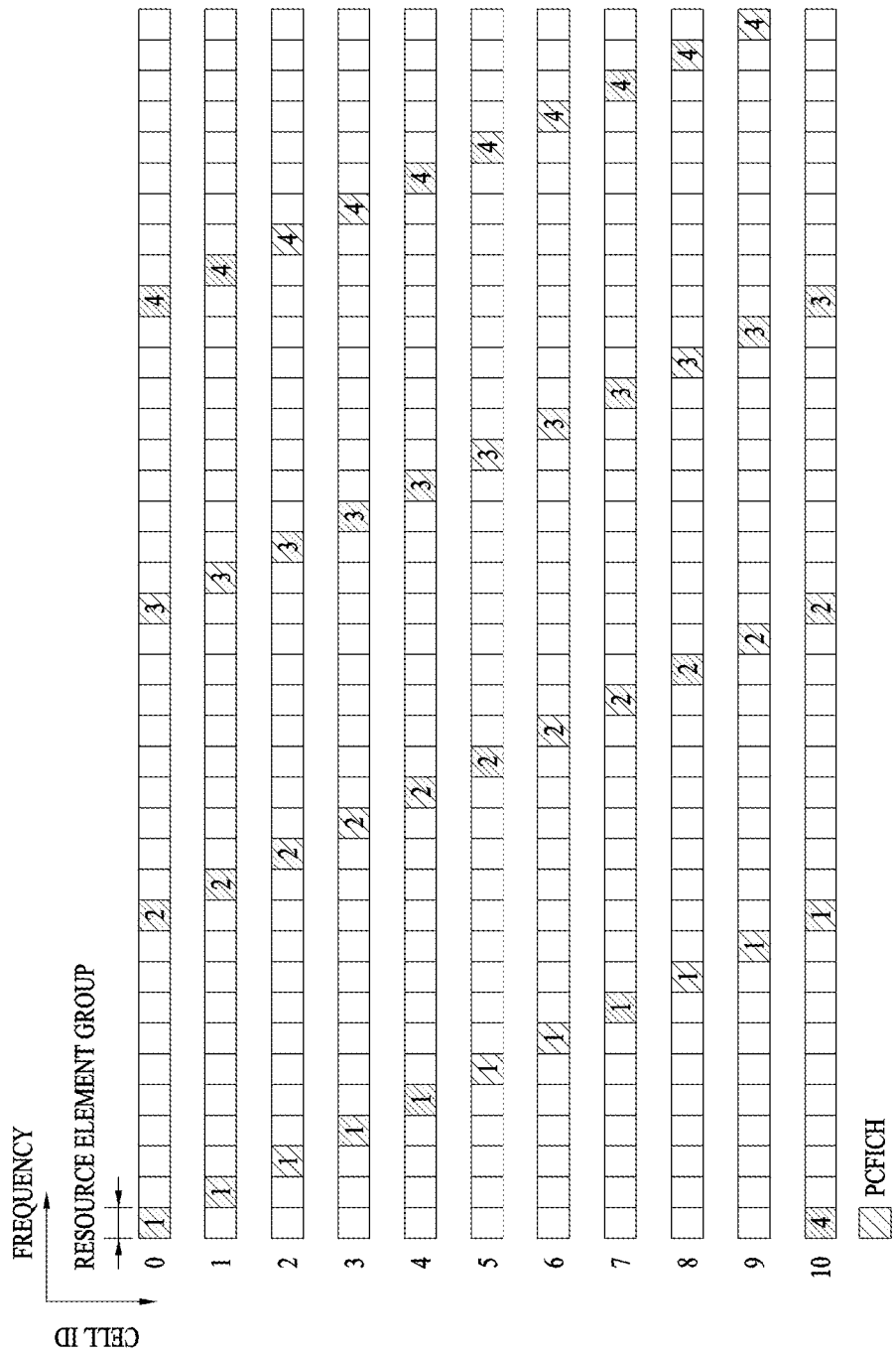
FIG. 12 is a diagram showing a transmission mode of a PCFICH.

FIG. 12 is a diagram showing a transmission mode of a PCFICH.

Referring to FIG. 12, a REG includes four subcarriers and includes only data subcarriers except for a reference signal. As described above, since 16 subcarriers are used for PCFICH transmission, four REGs may be used for PCFICH transmission. The REG to which the PCFICH is mapped may be changed according to the number of RBs in a frequency domain. In order to prevent inter-cell interference in the PCFICH, the REG to which the PCFICH is mapped may be shifted in the frequency domain according to cell ID. Since the PCFICH is always transmitted on the first OFDM symbol of the subframe, the receiver checks information about the PCFICH and then receives information about the PDCCH, when receiving the subframe.

Hereinafter, a PHICH will be described in detail.

The PHICH transmits ACK/NACK information for an uplink data channel and a plurality of PHICHs is grouped to one PHICH group, which is then mapped to the same REG. The PHICHs in the PHICH group may be distinguished by different sequences. For example, orthogonal sequences may be used. One PHICH group includes PHICH channels for a plurality of UEs. A plurality of PHICH groups may be generated within one subframe. For example, ACK/NACK information transmitted via the PHICH may be repeated three times and may be spread to four times, thereby generating 12 symbols. In this case, three REGs may be used for PHICH transmission.

Figure 13:
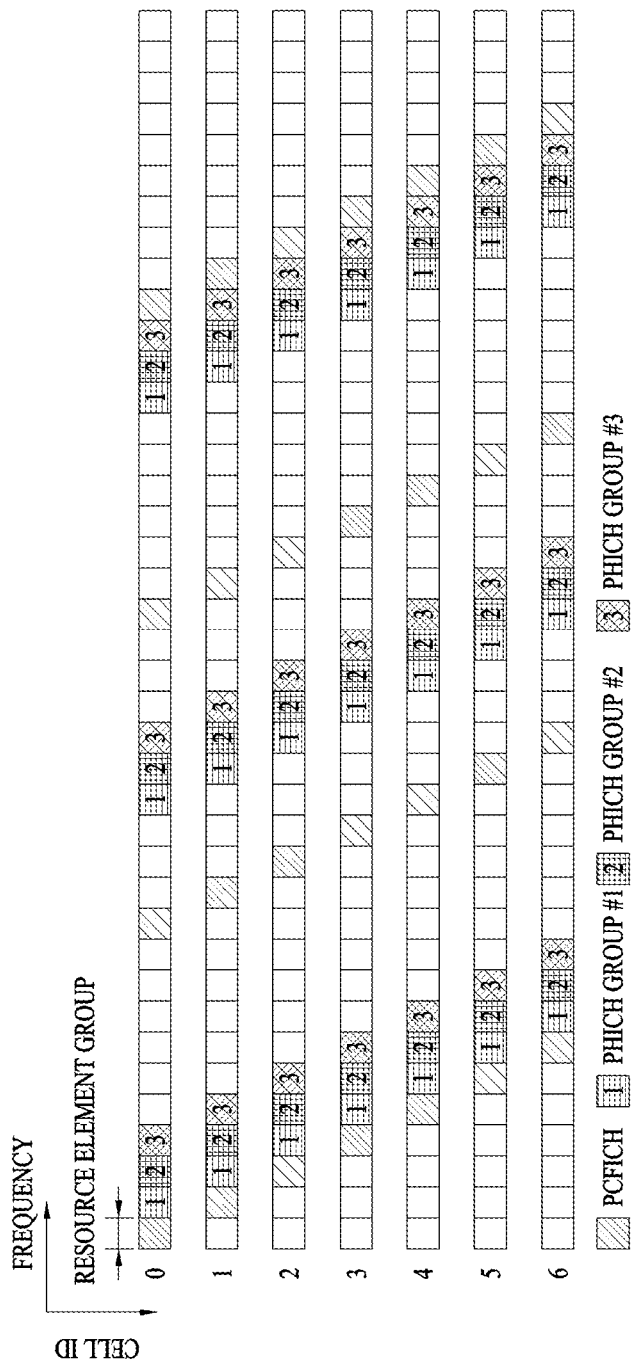
FIG. 13 is a diagram showing an example of mapping a PCFICH and a PHICH to a REG.

FIG. 13 is a diagram showing an example of mapping a PCFICH and a PHICH to a REG.

Referring to FIG. 13, three PHICH groups are shown. Each PHICH group is mapped to a REG to which the PCFICH is not mapped. Each PHICH group is transmitted via three REGs. The REG to which each PHICH groups is mapped is shifted in the frequency domain according to cell ID, in order to prevent inter-cell interference.

Allocation of the PHICH to each UE in several PHICH groups may be performed using frequency shift (cyclic shift) of a demodulation reference signal (DMRS) transmitted with uplink grant and a lowest PRB index of PUSCH resource allocation. PHICH resources may be known as the same index pair as $(n_{PHICH}^{group}, n_{PHICH}^{seq})$. In the index pair $(n_{PHICH}^{group}, n_{PHICH}^{seq})$, $n_{PHIC}^{group}$ denotes a PHICH group number and $n_{PHICH}^{seq}$ denotes an orthogonal sequence index within the PHICH group.

Table 2 shows an example of an orthogonal sequence used in a 3GPP LTE system.

TABLE 2

| Sequence index $n_{PHICH}^{seq}$ | Orthogonal sequence Normal cyclic prefix $N_{SF}^{PHICH} = 4$ | Extended cyclic prefix $N_{SF}^{PHICH} = 2$ |
| --- | --- | --- |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

$n_{PHICH}^{group}$ and $n_{PHICH}^{seq}$ may be obtained by Equation 1 below.

$$n_{PHICH}^{group} = (I_{PRB\_RA}^{lowest\_index} + n_{DMRS}) \bmod N_{PHICH}^{group}$$

$$n_{PHICH}^{seq} = (\lfloor I_{PRB\_RA}^{lowest\_index}/N_{PHICH}^{group} \rfloor + n_{DMRS}) \bmod 2N_{SF}^{PHICH} \quad \text{Equation 1}$$

In Equation 1, $n_{DMRS}$ denotes frequency shift of the DMRS used for uplink transmission related to the PHICH, $N_{SF}^{PHICH}$ denotes the magnitude of a spreading factor used for the PHICH, $I_{PRB\_RA}^{lowest\_index}$ denotes a lowest PRB index of uplink resource allocation, and $N_{PHICH}^{group}$ denotes the number of PHICH groups.

$N_{PHICH}^{group}$ may be obtained by Equation 2 below.

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases} \quad \text{Equation 2}$$

In Equation 2, $N_g$ denotes information about the amount of PHICH resources expressed by 2 bits ($N_g \in \{1/6, 1/2, 1, 2\}$) transmitted via a physical broadcast channel (PBCH) and $N_{RB}^{DL}$ denotes the number of RBs in downlink.

Figure 14:
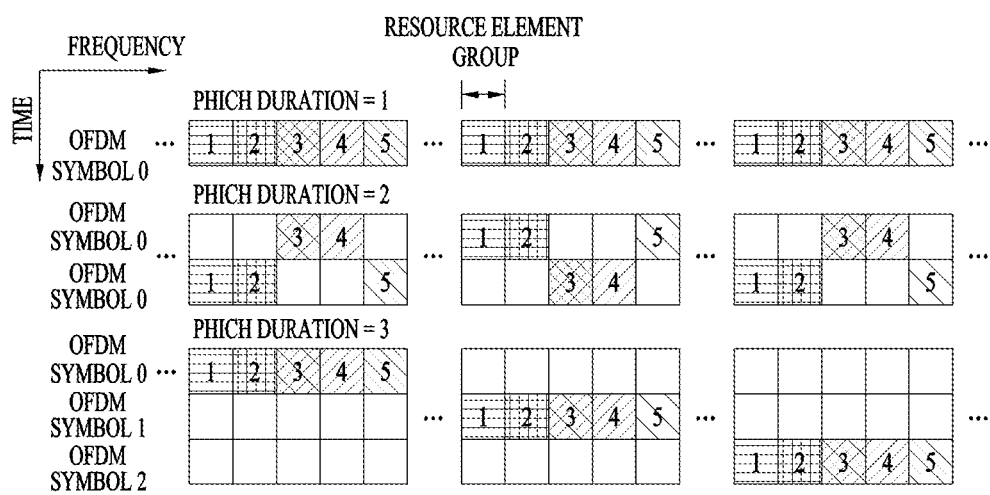
FIG. 14 is a diagram showing a configuration of a PHICH group within a subframe according to PHICH duration.

FIG. 14 is a diagram showing a configuration of a PHICH group within a subframe according to PHICH duration.

As shown in FIG. 14, the PHICH group may be composed of different time domains within one subframe according to PHICH duration {1, 2, 3}.

Hereinafter, a PDCCH will be described in detail.

Control information transmitted via the PDCCH is referred to as downlink control information (DCI). The size and use of control information transmitted via the PDCCH may be changed according to DCI format or the size of control information may be changed according to coding rate.

Table 3 shows DCI according to DCI format.

TABLE 3

| DCI format | Objectives |
| --- | --- |
| 0 | Scheduling of PUSCH |
| 1 | Scheduling of one PDSCH codeword |
| 1A | Compact scheduling of one PDSCH codeword |
| 1B | Closed-loop single-rank transmission |
| 1C | Paging, RACH response and dynamic BCCH |
| 1D | MU-MIMO |
| 2 | Scheduling of rank-adapted closed-loop spatial multiplexing mode |
| 2A | Scheduling of rank-adapted open-loop spatial multiplexing mode |
| 3 | TPC commands for PUCCH and PUSCH with 2 bit power adjustments |
| 3A | TPC commands for PUCCH and PUSCH with single bit power adjustments |

Referring to Table 3, the DCI format includes format 0 for scheduling of a PUSCH, format 1 for scheduling of one PDSCH codeword, format 1A for compact scheduling of one PDSCH codeword, format 1c for very compact scheduling of a DL-SCH, format 2 for PDSCH scheduling in a closed-loop spatial multiplexing mode, format 2A for PDSCH scheduling in an open-loop spatial multiplexing mode, and formats 3 and 3A for transmission of a transmission power control (TPC) command for an uplink channel. DCI format 1A may be used for PDSCH scheduling regardless of the transmission mode of the UE.

Such DCI format is independently applicable per UE and PDCCHs of several UEs may be multiplexed within one subframe. The PDCCH is composed of an aggregate of one or several control channel elements (CCEs). The CCE is a logical allocation unit used to provide a PDCCH with a coding rate according to radio channel state. The CCE refers to a unit corresponding to 9 sets of REGs composed of four resource elements. The BS may use {1, 2, 4, 8} CCEs in order to configure one PDCCH signal and {1, 2, 4, 8} is referred to as a CCE aggregation level. The number of CCEs used to transmit a specific PDCCH is determined by the BS according to channel state. The PDCCH configured according to UE is interleaved and mapped to a control channel region of each subframe by a CCE-to-RE mapping rule. The location of the PDCCH may depend on the number of OFDM symbols for a control channel of each subframe, the number of PHICH groups, transmit antenna, frequency shift, etc.

As described above, channel coding is performed independent of the multiplexed PDCCHs of the UEs and cyclic redundancy check (CRC) is applied. The CRC is masked with a Radio Network Temporary Identifier (RNTI) according to an owner or usage of the PDCCH. If the PDCCH is for a specific terminal, a cell-RNTI (C-RNTI) of the UE may be masked to the CRC. Alternatively, if the PDCCH is for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. To indicate a random access response that is a response to transmission of a random access preamble of the UE, a random access-RNTI (RA-RNTI) may be masked to the CRC. A unique identifier (UE ID) of each UE is masked to the CRC such that the UE receives the PDCCH thereof.

However, in the control region allocated within the subframe, the BS does not provide the UE with information about where the PDCCH of the UE is located. Since the UE does not know the location of the PDCCH thereof and at which CCE aggregation level or with which DCI format the PDCCH thereof is transmitted, the UE monitors a set of PDCCH candidates within the subframe to detect the PDCCH thereof, in order to receive the control channel from the BS. This is referred to as blind decoding (BD). BD may also be referred to as blind detection or blind search. BD refers to a method of, at a UE, de-masking a UE ID thereof in a CRC portion, checking CRC errors, and determining whether a PDCCH is a control channel thereof.

If the UE attempts BD per CCE aggregation level with respect to all DCI formats to be monitored with respect to all possible RNTIs, the number of detection attempts is too large, a search space (SS) is defined for BD of the UE in an LTE system. The SS means a PDCCH candidate set to be monitored and the size thereof may be changed according to PDCCH format.

The SS may be composed of a common search space (CSS) and a UE-specific/dedicated search space (USS). In the CSS, all UEs can know the size of the CSS and the USS may be individually set per UE. Accordingly, the UE should monitor both the USS and the CSS in order to decode the PDCCH. Accordingly, BD is performed a maximum of 44 times in one subframe. Here, BD performed according to different CRS values (e.g., C-RNTI, P-RNTI, SI-RNTI and RA-RNTI) is not included.

Hereinafter, uplink retransmission will be described in detail.

An uplink retransmission method may be configured via the PHICH and DCI format 0 (PUSCH scheduling). ACK/NACK is received via the PHICH and synchronous non-adaptive retransmission is performed or synchronous adaptive retransmission is performed via DCI format 0. That is, in these two cases, only synchronous retransmission is supported and synchronous retransmission should be performed in a given time after first packet transmission.

Non-adaptive retransmission via the PHICH refers to a method of applying the same transmission method in the same frequency resource (PRB) region in which a first packet is transmitted to perform transmission, and adaptive retransmission via DCI format 0 refers to a method of applying frequency resources and the transmission method according to scheduling information to perform transmission. At this time, the UE ignores the PHICH and transmits the signal according to PUSCH scheduling information, upon simultaneously receiving PHICH and PUSCH scheduling. The UE regards previous packet transmission as successful and flushes a buffer when a new data indicator (NDI) of the PUSCH scheduling information is toggled, but maintains the buffer for previous packets if the NDI is not toggled even when ACK is received via the PHICH.

1.3. Uplink System

As described above, in a UE in which power efficiency is important, an SC-FDMA scheme for decreasing a peak-to-average power ratio (PAPR) or cubic metric (CM) and efficiently performing transmission while avoiding a non-linear distortion portion of a power amplifier is used.

Figure 15:
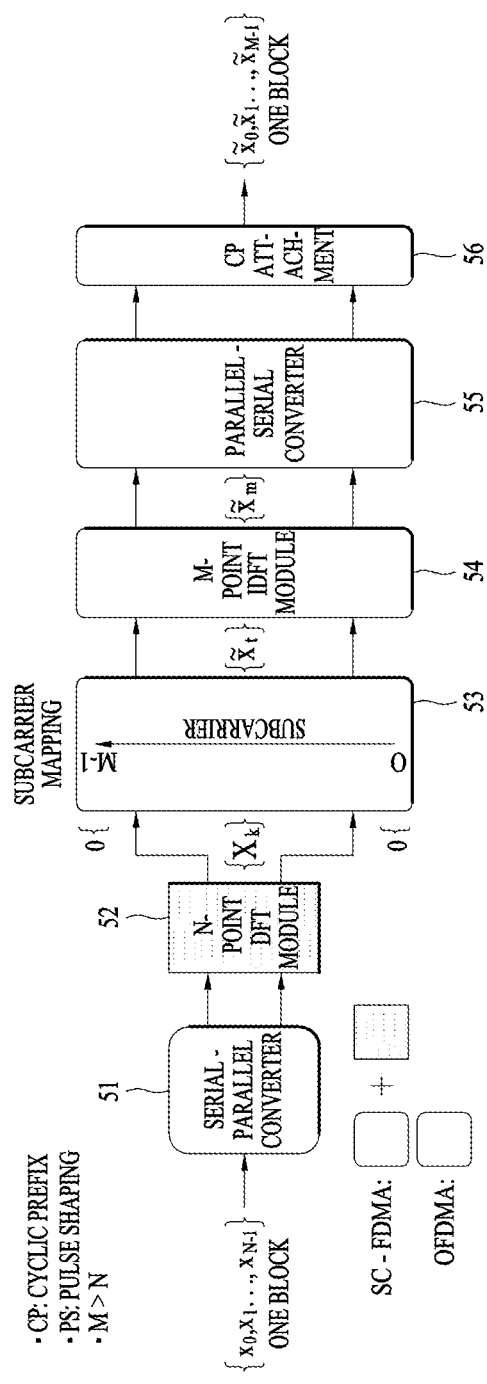
FIG. 15 is a diagram for comparing an SC-FDMA scheme and an OFDMA scheme.

FIG. 15 is a diagram for comparing an SC-FDMA scheme and an OFDMA scheme.

Referring to FIG. 15, a UE for UL signal transmission and a BS for DL signal transmission are identical in that a serial-to-parallel converter 151, a subcarrier mapper 153, an M-point Inverse Discrete Fourier Transform (IDFT) module 154, a parallel-to-serial converter 155 and a Cyclic Prefix (CP) attachment module 156 are included.

The UE for transmitting a signal using an SC-FDMA scheme further includes an N-point DFT module 152. N data symbols generated by the parallel-to-serial converter 151 are input to the N-point DFT module 152. At this time, N data symbol components are spread over allocated bandwidth. Subsequently, if it is assumed that bandwidth corresponding to N subcarriers is allocated to the UE, the output signal of the N-point DFT module 152 is mapped to the allocated location of the whole uplink system bandwidth (input of the M-point IDFT module). That is, the N-point DFT module 152 partially offsets an IDFT processing influence of the M-point IDFT module 154 such that the transmitted signal has a single carrier property.

FIG. 16 is a diagram illustrating a signal mapping scheme in a frequency domain for satisfying a single carrier property in the frequency domain.

FIG. 16(a) shows a localized mapping scheme and FIG. 16(b) shows a distributed mapping scheme. In a 3GPP LTE system, the localized mapping scheme is defined.

In the clustered SC-FDMA scheme which is a modified form of the SC-FDMA scheme, DFT process output samples are divided into several sub-groups and then are non-contiguously mapped to subcarrier regions per sub-group, in a subcarrier mapping process. According to circumstance, a filtering process and a cyclic extension process may be included. At this time, the sub-group is referred to as a cluster and cyclic extension means insertion of a guard interval longer than maximum delay spread of a channel between contiguous symbols in order to prevent inter-symbol interference (ISI) while symbols of the subcarrier are transmitted via a multipath channel.

Figure 17:
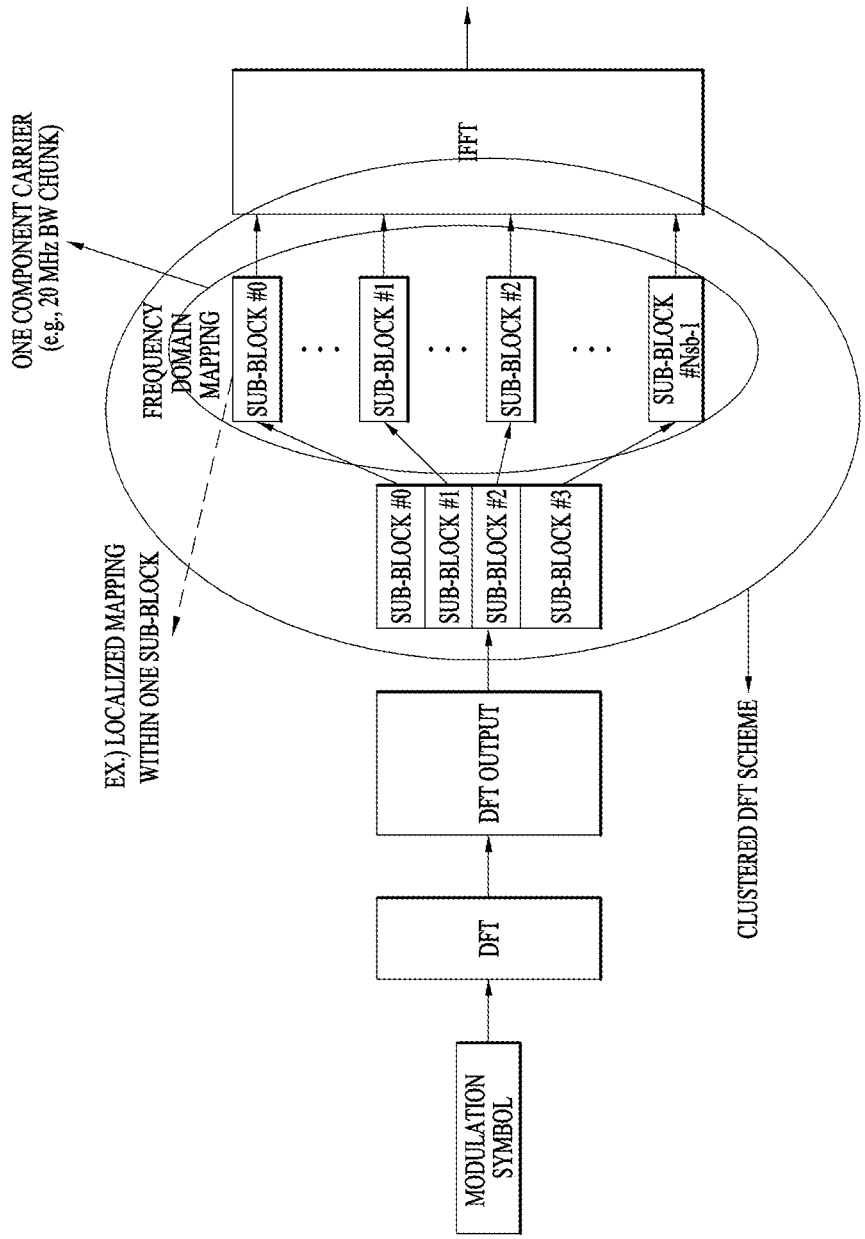
FIG. 17 is a diagram showing a signal processing procedure for mapping DFT process output samples to a single carrier in clustered SC-FDMA.
Figure 18:
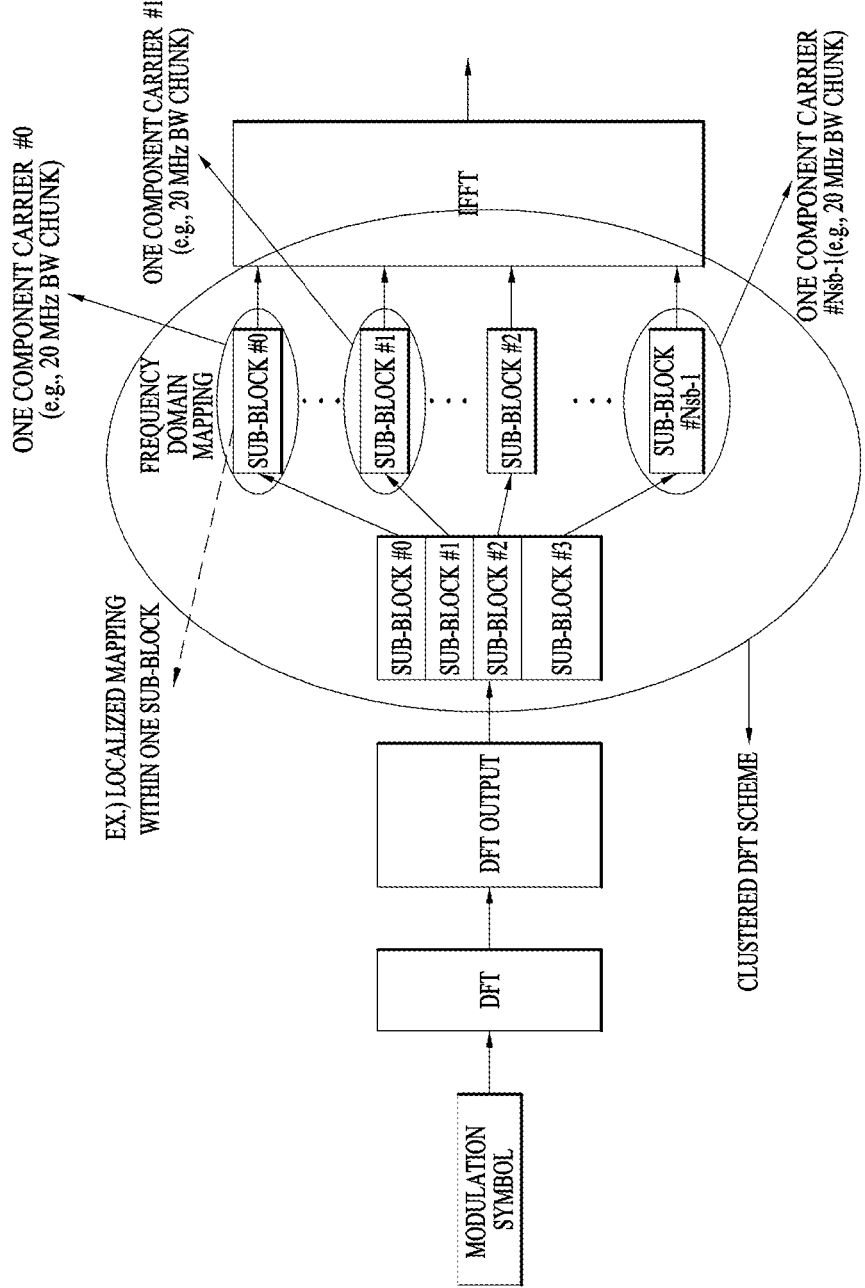
FIGS. 18 and 19 are diagrams showing a signal processing procedure for mapping DFT process output samples to multiple carriers in clustered SC-FDMA.
Figure 19:
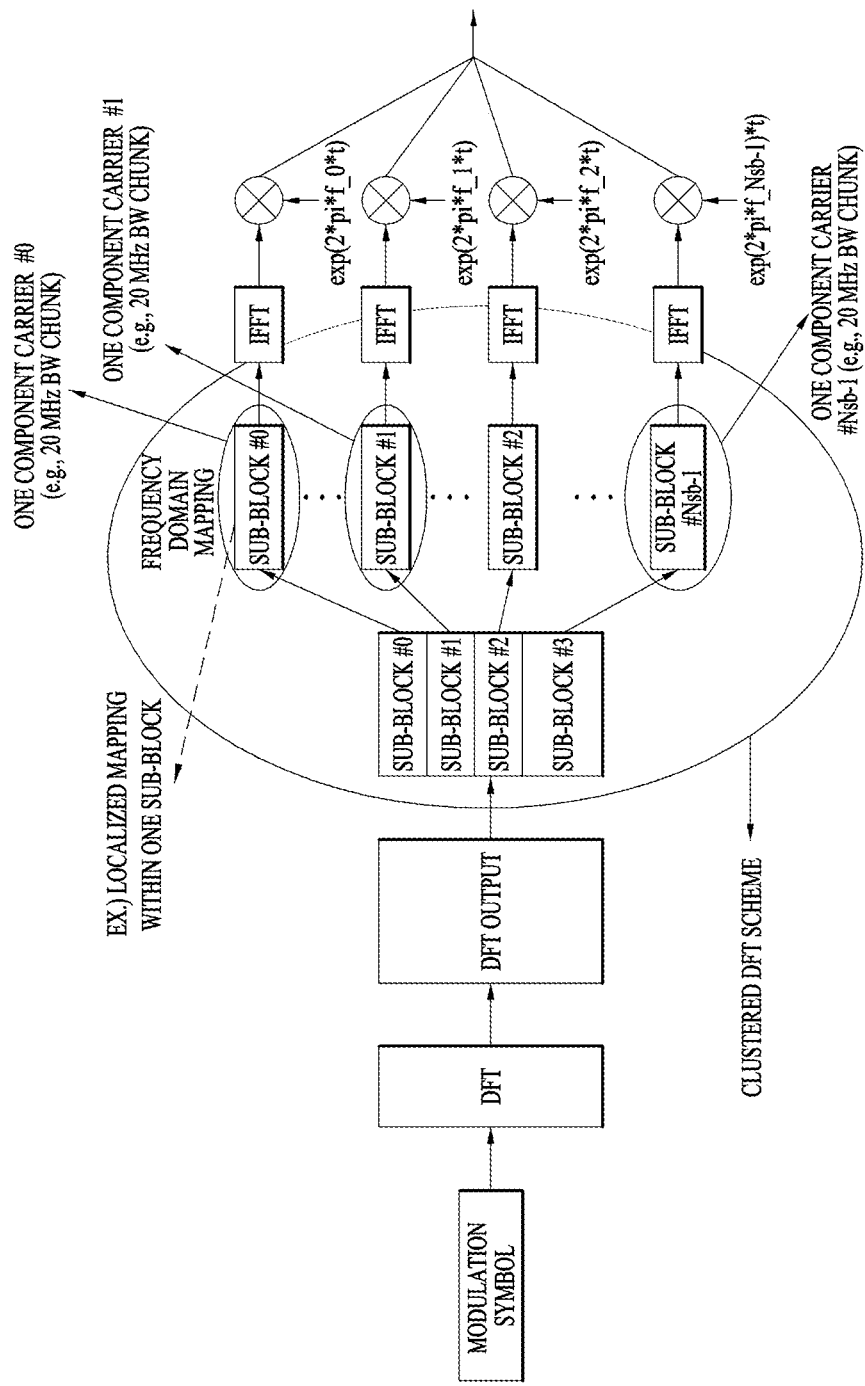

FIG. 17 is a diagram showing a signal processing procedure for mapping DFT process output samples to a single carrier in clustered SC-FDMA. FIGS. 18 and 19 are diagrams showing a signal processing procedure for mapping DFT process output samples to multiple carriers in clustered SC-FDMA.

FIG. 17 shows an example of applying an intra-carrier clustered SC-FDMA scheme and FIGS. 18 and 19 show examples of applying an inter-carrier clustered SC-FDMA scheme. FIG. 18 shows the case in which a signal is generated by a single IFFT block when a subcarrier spacing between contiguous component carriers is aligned in a state in which component carriers are contiguously allocated in a frequency domain and FIG. 19 shows the case in which a signal is generated by a plurality of IFFT blocks in a state in which component carriers are non-contiguously allocated in the frequency domain.

In segmented SC-FDMA, IFFTs corresponding in number to a certain number of DFTs are applied such that the DFTs and the IFFTs are in one-to-one correspondence and DFT spreading of the conventional SC-FDMA scheme and the frequency subcarrier mapping configuration of the IFFTs are extended. Therefore, segmented SC-FDMA is also referred to as NxSC-FDMA or NxDFT-s-OFDMA. Hereinafter, the term "segmented SC-FDMA" is used, for convenience.

Figure 20:
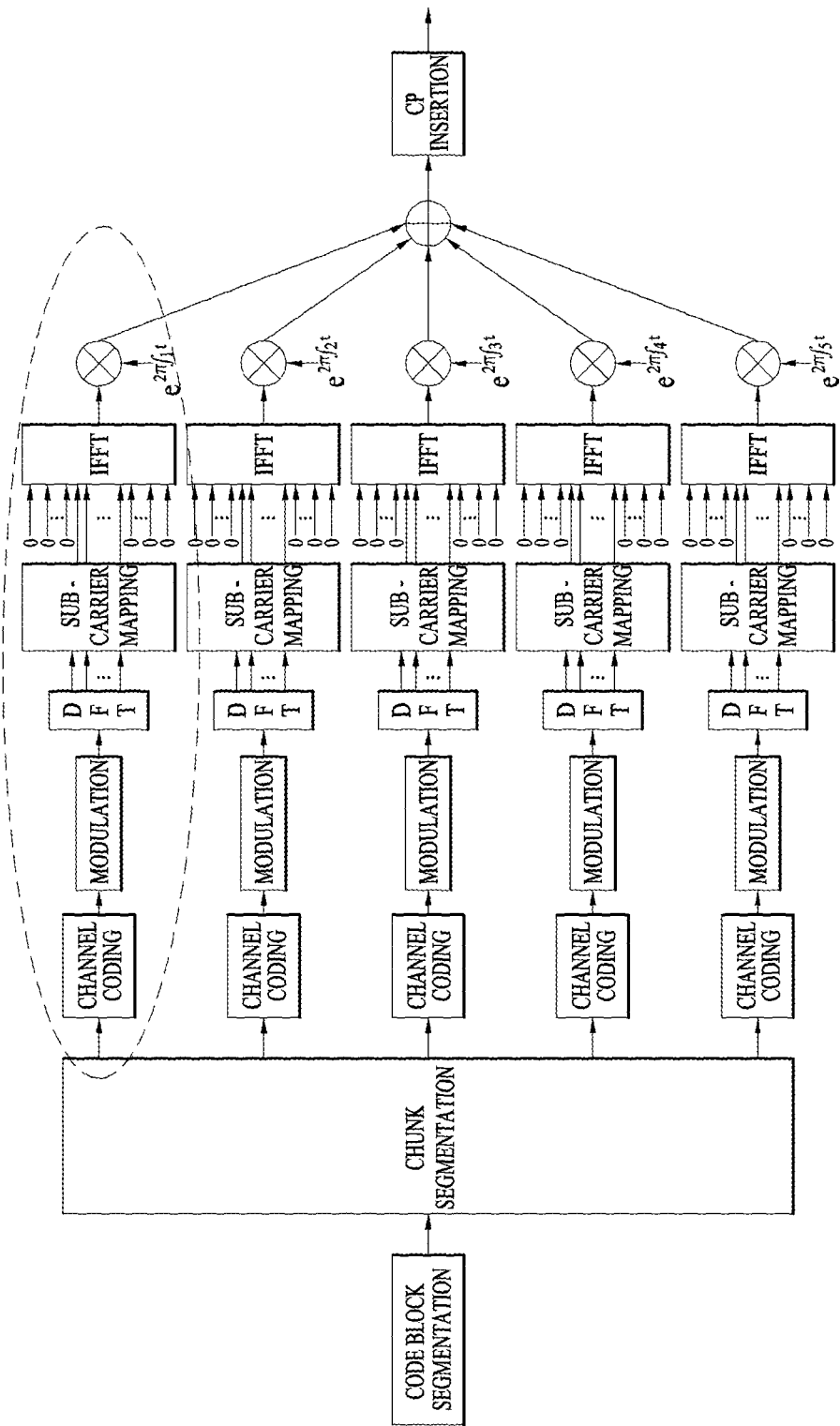
FIG. 20 is a diagram showing a signal processing procedure in segmented SC-FDMA.

FIG. 20 is a diagram showing a signal processing procedure in segmented SC-FDMA.

Referring to FIG. 20, segmented SC-FDMA is characterized in that modulation symbols of an entire time domain are grouped into N (N being an integer greater than 1) groups and a DFT process is performed on a group unit basis, in order to reduce a single carrier property condition.

FIG. 21 is a diagram illustrating a signal processing procedure for transmitting a reference signal in uplink. A data part is mapped to a frequency domain via a DFT precoder after a signal is generated in the time domain and then is transmitted via IFFT, but a reference signal does not pass through a DFT precoder. The reference signal is immediately generated in the frequency domain (S211), is sequentially subjected to localized mapping (S212), an IFFT process (S213) and a cyclic prefix (CP) attachment process (S214), and is transmitted.

FIG. 22 is a diagram showing a subframe structure for transmitting a reference signal.

FIG. 22(*a*) shows the structure of a subframe for transmitting a reference signal in a normal CP case and FIG. 22(*b*) shows the structure of a subframe for transmitting a reference signal in an extended CP case. Referring to FIG. 22(*a*), the reference signal is transmitted via fourth and eleventh SC-FDMA symbols in the normal CP and, referring to FIG. 22(*b*), the reference signal is transmitted via third and ninth SC-FDMA symbols in the extended CP.

2. Method for Transmitting Downlink Control Information

A 3GPP LTE-A system is extended from a legacy 3GPP LTE system by supporting technologies for extension to heterogeneous networks including multi-carrier environments, multi-user MIMO technology, relays, femto cells, hotzone cells, etc.

In a 3GPP LTE-A system, it is difficult to equally use a legacy 3GPP LTE downlink control channel in order to obtain maximum performance using such technologies. Accordingly, in the 3GPP LTE-A system, introduction of an enhanced PDCCH (E-PDCCH) is decided in order to increase capacity of the PDCCH in the legacy LTE system. The E-PDCCH is also referred to as an advanced PDCCH (A-PDCCH). Hereinafter, for convenience of description, an E-PDCCH/A-PDCCH is referred to as "E-PDCCH" and a legacy physical downlink control channel is referred to as a "legacy-PDCCH".

Figure 23:
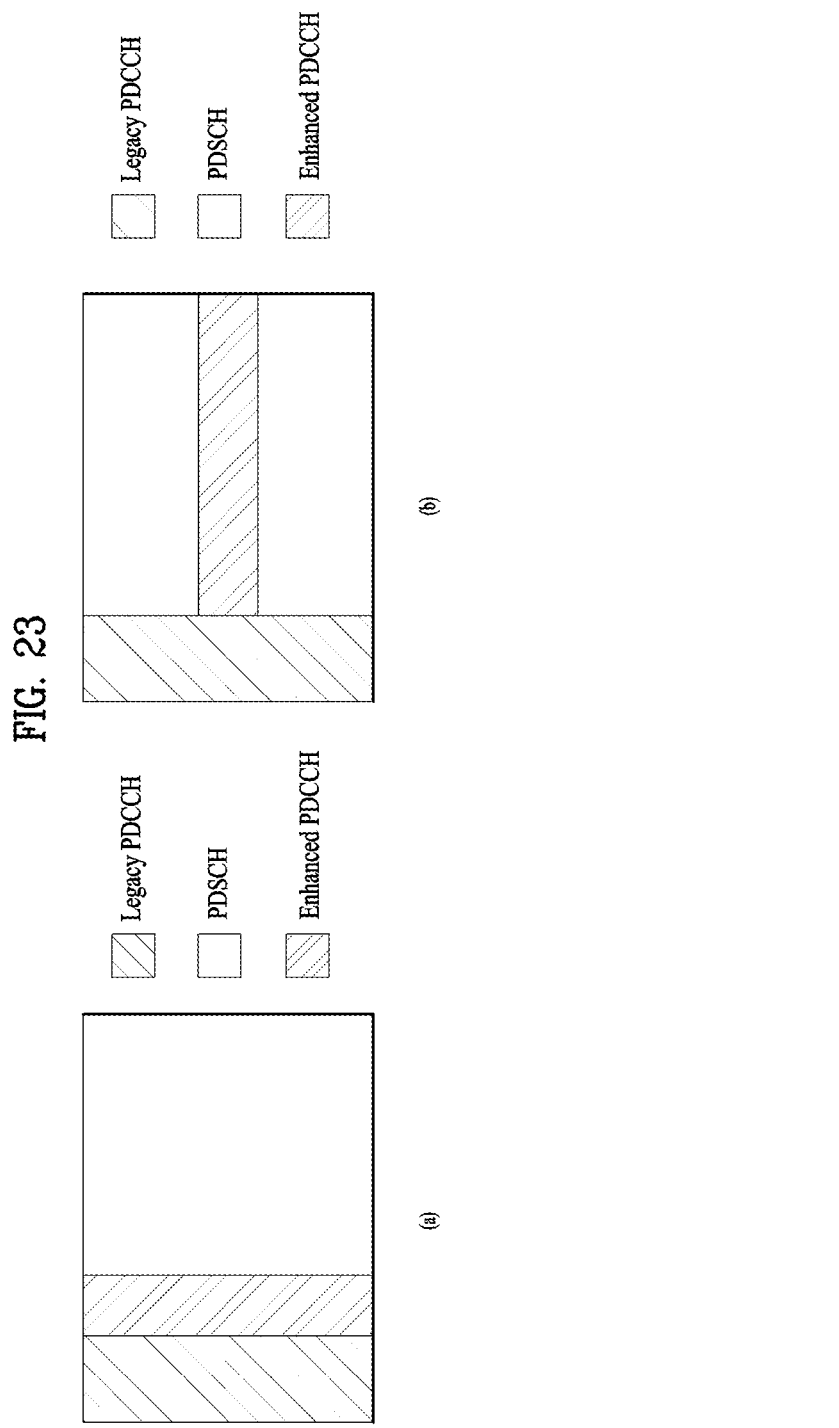
FIG. 23 is a diagram showing a structure of an E-PDCCH.

FIG. 23 is a diagram showing a structure of an E-PDCCH.

Referring to FIG. 23, FIG. 23(*a*) shows a structure in which the E-PDCCH and the PDSCH are multiplexed using a time division multiplexing (TDM) method and FIG. 23(*b*) shows a structure in which the E-PDCCH and the PDSCH are multiplexed using a frequency division multiplexing (FDM) method. The E-PDCCH is decided to be located in a legacy PDSCH region.

In addition, a method for locating a common search space (CSS) for transmitting common control information (CCI) shared among a plurality of UEs of downlink control information in an E-PDCCH region or PDSCH region is being discussed. Therefore, even when a UE, which uses a 3GPP LTE/LTE-A Rel-11 scheme and a subsequent scheme thereof, or a UE, which is configured to decode the E-PDCCH, may not decode the legacy PDCCH region in a process of transmitting and receiving data to and from the BS, no problem occur.

If a CSS is located in a legacy PDCCH region, since resources, to which the CSS is mapped, are fixed to first 16 CEEs of a downlink control channel region, a region, in which a UE searches for the CSS, is predetermined and is not influenced by frequency bandwidth used by the UE. However, if the CSS is located in a PDSCH region or an E-PDCCH region, the CSS is influenced by frequency bandwidth used by the UE or the (e.g., TDM or FDM based) structure or resources of the E-PDCCH, such that the location of the CSS may be changed. If the location of the CSS may be changed, the UE may not receive the CSS or the search area may be increased although the CSS is received, thereby increasing delay or power, which is necessary to receive the information about the CSS. Hereinafter, in order to solve such problems, a method of, at a UE, acquiring information about resources used by the CSS located in the E-PDCCH or PDSCH at a fixed location is proposed.

Figure 24:
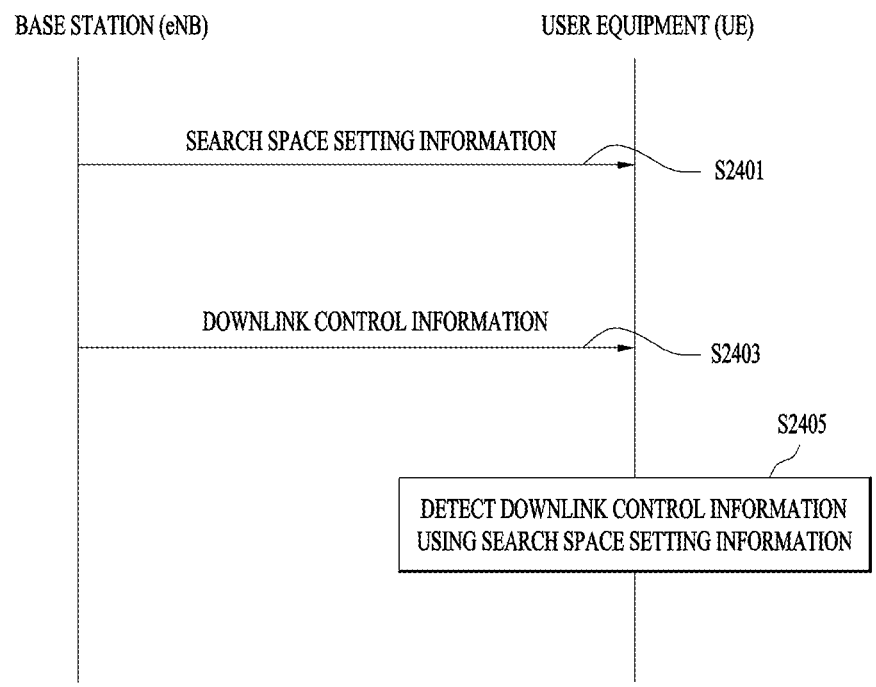
FIG. 24 is a diagram illustrating a method for transmitting downlink control information according to one embodiment of the present invention.

FIG. 24 is a diagram illustrating a method for transmitting downlink control information according to one embodiment of the present invention.

Referring to FIG. 24, an eNB transmits setting information of a search space defined in a PDSCH region or an E-PDCCH region to a UE (S2401). Here, the eNB may transmit the setting information of the search space to the UE via a channel transmitted in a constant region regardless of system bandwidth set with respect to the UE. For example, a physical broadcast channel (PBCH) may be used. The setting information of the search space includes information directly or indirectly indicating resources or a resource range in which the search space defined in the PDSCH region or the E-PDCCH region is located. At this time, the search space may include a CSS and/or a UE-specific search space (USS). In addition, the setting information of the search space may include information about transmission of downlink control information transmitted via the search space (e.g., transmit antenna port, transmission method, etc. of the reference signal). In addition, the search space may be defined with a predetermined period unlike the conventional method. In this case, the setting information of the search space may include information about the period (the number of subframes or radio frames) if necessary. The setting information of the search space will be described in detail below.

Subsequently, the eNB transmits downlink control information to the UE via the search space defined in the PDSCH region or the E-PDCCH region (S2403) and the UE searches for the search space using the setting information of the search space received in step S2401 and detects the downlink control information (S2405).

2.1. Search Space Setting Information—1

2.1.1. Resource Location Allocated to Search Space.

The eNB may transmit, to the UE, setting information of the E-PDCCH region or the PDSCH region, in which the CSS is defined, via a transmitted downlink channel regardless of system bandwidth. For example, among the physical downlink channels of an LTE-A system, since a PBCH is transmitted on a total of six RBs including three RBs located at one side of a center frequency and three RBs located at the other side of the center frequency regardless of system bandwidth, the eNB may use the PBCH to transmit the information about the CSS region. That is, information about allocation resources of the CSS defined in the E-PDCCH or PDSCH region may be transmitted via the PBCH. The UE may receive, from the eNB, the information about the region, in which the CSS is located, via the PBCH and search for the common control information in the region, thereby reducing delay and power necessary for the process of searching for the CSS.

1) Accurate information about resources allocated to the CSS or information about an allocable resource range of the CSS may be transmitted via the PBCH. As the PDCCH is composed of a set of one or several consecutive CCEs, a logical resource allocation unit (e.g., an enhanced CCE (E-CCE)) for configuring an E-PDCCH may be used. In this case, the eNB may use an index (e.g., an E-CCE index) of a logical resource allocation unit for configuring the E-PDCCH or a symbol index and/or a subcarrier index in order to inform the UE of the accurate information of the resources allocated to the CSS or the information about the candidate resource range of the CSS.

2) Set information or region information of E-PDCCHs, to which the CSS is allocated, may be transmitted via the PBCH. Here, one or more E-PDCCH regions may be set and specific set or region information of the one or more E-PDCCH regions may be indicated. For example, the E-PDCCH region may be set in RB pair units within one subframe. In this case, the UE may be informed of one or more pieces of E-PDCCH set or region information among the plurality of E-PDCCH regions set within one subframe.

3) The resources or resource range allocated to the CSS may be computed using a function of information transmitted via the PBCH and/or a cell ID. Here, the resources or resource range allocated to the CSS may be indicated by the index of the logical resource allocation unit (e.g., an enhanced CCE (E-CCE)) for configuring the E-PDCCH or a symbol index and/or a subcarrier index. Alternatively, the resources or resource range allocated to the CSS may be indicated by the above-described E-PDCCH set or region.

In addition, this method is applicable to the USS. That is, information about resources allocated to the USS may be transmitted via the PBCH. For example, the resources or resource range allocated to the USS may be computed using a function of information transmitted via the PBCH and/or a UE-specific ID (e.g., station ID). Even in this case, the resources or resource range allocated to the USS may be indicated by the index of the logical resource allocation unit (e.g., an enhanced CCE (E-CCE)) for configuring the E-PDCCH or a symbol index and/or a subcarrier index.

2.1.2. Control Information Transmission Information

The following information related to the CSS located in the E-PDCCH or the PDSCH may be transmitted via the PBCH.

1) Antenna port information of a DMRS used to demodulate common control information transmitted in the CSS located in the E-PDCCH or PDSCH region may be transmitted via the PBCH. Here, the antenna port, via which the DMRS is transmitted, may be equal to the antenna port related to E-PDCCH transmission. In addition, the DMRS related to the E-PDCCH may be transmitted only in the region to which the E-PDCCH is mapped and may be mapped to the RE so as not to overlap with the DMRS related to the PDSCH.

2) Information about a transmission scheme of common control information transmitted in the CSS located in the E-PDCCH or the PDSCH region may be transmitted via the PBCH. For example, modulation and coding scheme (MCS), code rate, etc. may be transmitted.

2.2. Search Space Setting Information—2

The eNB may transmit, to the UE, allocation information of a cell common search space defined in the PDSCH region without distinction of CSS or USS.

1) Each UE may acquire all or some of common control information transmitted via the CSS via blind decoding in a cell common search space region, UE-specific control information transmitted via the USS, and new information necessary for a UE, which is configured to decode the E-PDCCH, or a UE, which uses a 3GPP LTE/LTE-A Rel-11 scheme and a subsequent scheme thereof.

2) The cell common search space region may be generally configured using a distributed mapping method to suit frequency diversity transmission. For example, a resource allocation (RA) type-2 distributed virtual resource block (DVRB) method may be used. For example, the E-PDCCH may be interleaved in RB units to be distributed and mapped to the cell common search space region. In addition, a CCE based mapping scheme of a legacy PDCCH may be used. For example, as in the CCE of the legacy PDCCH, if the E-CCE is defined as a logical resource allocation unit configuring the E-PDCCH is defined and an enhanced resource element group (E-REG) configuring the E-CCE is defined, the E-PDCCH may be interleaved in E-REG units to be distributed and mapped to the cell common search space region.

The cell common search space region may be defined in the PDSCH region without distinction of CSS and USS and the remaining region, which is not used for the cell common search space region, of the PDSCH region may be set as a data transmission region.

2.3. Search Space Setting Information—3

In a UE, which uses a 3GPP LTE/LTE-A Rel-11 scheme and a subsequent scheme thereof, resources of the PDCCH and the PDSCH may be differently set as follows. That is, the frequency bandwidths or the numbers of physical resource blocks (PRB) of the PDCCH and the PDSCH may be differently set. For example, the PDCCH is allocated to the entire system bandwidth and the PDSCH may be allocated to a part of the system bandwidth centered on the center frequency. In this case, as described above, if the search space or control information is mapped to a PDSCH region, the search space or the control information may be mapped according to predetermined rule based on the resources or frequency bandwidth of the allocated PDSCH region and/or the number of PRBs. The eNB may transmit, to the UE, information about frequency bandwidth allocated to the PDSCH region and/or the number of PRBs in the cell via the PBCH, and the UE may compute the resources or resource range, to which the search space is allocated, using the information about the frequency bandwidth of the PDSCH and/or the number of PRBs received via the PBCH.

Information about the rule (or function) for computing the resources or resource range, to which the search space is allocated, may be transmitted to the UE via higher layer signaling or may be known to the UE in advance. When the cell (or component carrier) which services the UE is changed, the frequency bandwidth of the PDSCH and/or the number of PRBs may be changed and a resource region, to which the search space is allocated, may be regularly changed according to the frequency bandwidth and/or the number of PRBs.

The UE, which uses the 3GPP LTE/LTE-A Rel-11 scheme and a subsequent scheme thereof, or the UE, which is configured to decode the E-PDCCH, may acquire information about resources, to which the search space is allocated, via the PBCH and receive a response message to a second message of a random access procedure, that is, a PRACH, via a search space region in the random access procedure. That is, the UE may perform the random access procedure without using a legacy PDCCH region in the random access procedure.

In addition, the primary downlink control channel of the UE, which uses the 3GPP LTE/LTE-A Rel-11 scheme and a subsequent scheme thereof, or the UE, which is configured to decode the E-PDCCH, may be an E-PDCH. That is, the UE, which uses the 3GPP LTE/LTE-A Rel-11 scheme and a subsequent scheme thereof, or the UE, which is configured to decode the E-PDCCH, may receive control information via the E-PDCCH unless indicated otherwise via higher layer configuration. In addition, the UE, which uses the 3GPP LTE/LTE-A Rel-11 scheme and a subsequent scheme thereof, or the UE, which is configured to decode the E-PDCCH, may search for the common search space in the E-PDCCH region or the PDSCH region unless indicated otherwise via higher layer configuration.

In addition, the eNB may further inform the UE of information about a region monitoring period of the UE in addition to the location information of the search space region fixed in the PBCH. That is, the search space region defined in the E-PDCCH region or the PDSCH region may not be set in every subframe but may be set with a period corresponding to a specific number of subframes (or radio frames). In addition, the eNB may commonly transmit the region information to all UEs (users) via the PBSCH and may configure information about the region monitoring period of each UE via RRC signaling in a UE-specific manner.

The above-described method is equally applicable to a specific UE (e.g., a low-cost machine-type communication (MTC) device) among the UEs, which use the 3GPP LTE/LTE-A Rel-11 scheme and a subsequent scheme thereof or use the E-PDCCH. In addition, the above-described method is applicable along with the USS which is set in a legacy PDCCH region via RRC signaling in a UE-specific manner. In addition, the above-described method may be used as a fallback method when reception problems occur in an E-PDCCH configured via RRC signaling in a UE-specific manner or when an E-PDCCH is newly configured due to handover. Accordingly, although RRC configuration or reconfiguration for the E-PDCCH may be performed via a legacy PDCCH, the RRC configuration or reconfiguration may be transmitted via a region which is fixedly configured in the above-described E-PDCCH region or PDSCH region.

By this method, the UE may operate only via the E-PDCCH region or PDSCH region without decoding the legacy PDCCH region.

3. General Apparatus to which the Present Invention is Applicable

Figure 25:
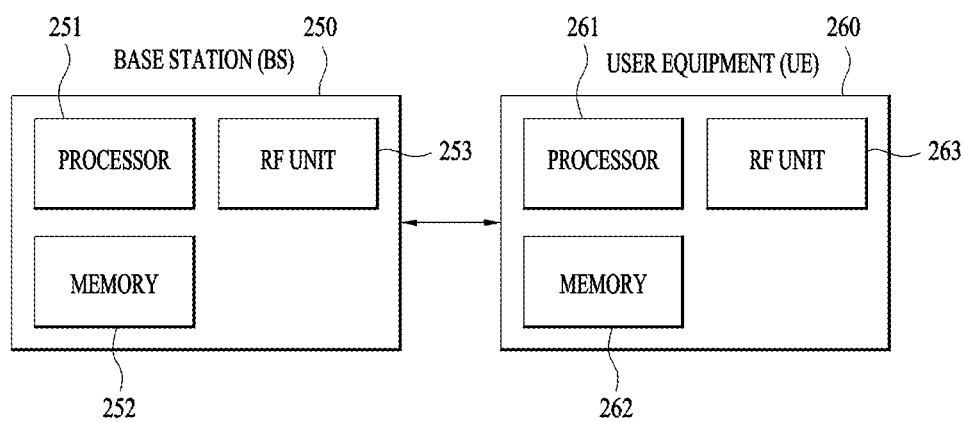
FIG. 25 is a block diagram showing a wireless communication apparatus according to one embodiment of the present invention.

FIG. 25 is a block diagram showing a wireless communication apparatus according to one embodiment of the present invention.

Referring to FIG. 25, the wireless communication system includes a base station (BS) 250 and a plurality of UEs 260 located in an area of the BS 250.

The BS 250 includes a processor 251, a memory 252 and a radio frequency (RF) unit 253. The processor 251 implements a proposed function, procedure and/or method. Layers of radio interface protocol may be implemented by the processor 251. The memory 252 is connected to the processor 251 to store a variety of information for driving the processor 251. The RF unit 253 is connected to the processor 251 to transmit and/or receive RF signals.

The UE 260 includes a processor 261, a memory 262 and a radio frequency (RF) unit 263. The processor 261 implements a proposed function, procedure and/or method. Radio interface protocol layers may be implemented by the processor 261. The memory 262 is connected to the processor 261 to store a variety of information for driving the processor 261. The RF unit 263 is connected to the processor 261 to transmit and/or receive RF signals.

The memories 252 and 262 may be located inside or outside the processors 251 and 261 and may be connected to the processors 251 and 261 via a well-known means, respectively. In addition, the BS 250 and/or the UE 260 may have a single antenna or multiple antennas.

The embodiments of the present invention described hereinabove are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in the embodiments of the present invention may be rearranged. Some constructions of any one embodiment may be included in another embodiment and may be replaced with corresponding constructions of another embodiment. It is obvious that claims that are not explicitly cited in each other in the appended claims may be presented in combination as an embodiment of the present invention or included as a new claim by subsequent amendment after the application is filed.

The embodiments of the present invention may be achieved by various means, for example, hardware, firmware, software, or a combination thereof. In a hardware configuration, the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although an example of applying a data transmission and reception method in a radio access system according to the present invention to a 3GPP LTE system has been described, the present invention is applicable to various radio access systems in addition to the 3GPP LTE system.

The invention claimed is:

1. A method for receiving downlink control information (DCI) in a radio access system, the method comprising:
receiving, from a base station (BS), information about a first resource region for an enhanced physical downlink control channel (E-PDCCH) via a physical broadcast channel (PBCH);
calculating a second resource region using a function of the first resource region and a cell ID, wherein the second resource region is used as a search space of the E-PDCCH and is different from the first resource region; and
receiving the DCI from the BS via the search space allocated in the second resource region.

2. The method according to claim 1, wherein the information about the first resource region indicates one or more E-PDCCH regions among the plurality of E-PDCCH regions in a subframe.

3. The method according to claim 1, wherein any one of modulation and coding scheme (MCS) information and code rate information for transmitting the DCI is transmitted via the PBCH.

4. The method according to claim 1, wherein a response message to a physical random access channel (PRACH) is transmitted via the search space.

5. A user equipment (UE) for receiving downlink control information (DCI) in a radio access system, the UE comprising:
a radio frequency (RF) unit configured to transmit and receive an RF signal; and
a processor configured to receive, from a base station (BS), information about a first resource region for an enhanced physical downlink control channel (E-PDCCH) region via a physical broadcast channel (PBCH), to calculate a second resource region using a function of the first resource region and a cell ID and to receive the DCI from the BS via the search space allocated in the second resource region,
wherein the second resource region is used as a search space of the E-PDCCH and is different from the first resource region.

* * * * *